(12) United States Patent
Ichinose et al.

(10) Patent No.: US 11,403,897 B2
(45) Date of Patent: *Aug. 2, 2022

(54) VEHICLE ENTRY SYSTEM AND ONBOARD DEVICE

(71) Applicant: MITSUI KINZOKU ACT CORPORATION, Yokohama (JP)

(72) Inventors: Mikio Ichinose, Yokohama (JP); Hiroki Hattori, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/470,721

(22) PCT Filed: Dec. 20, 2016

(86) PCT No.: PCT/JP2016/087993
§ 371 (c)(1),
(2) Date: Jun. 18, 2019

(87) PCT Pub. No.: WO2018/116382
PCT Pub. Date: Jun. 28, 2018

(65) Prior Publication Data
US 2020/0090437 A1 Mar. 19, 2020

(51) Int. Cl.
*G07C 9/00* (2020.01)
*G06F 3/0481* (2022.01)
(Continued)

(52) U.S. Cl.
CPC ......... *G07C 9/00309* (2013.01); *B60N 2/002* (2013.01); *G05D 1/0033* (2013.01);
(Continued)

(58) Field of Classification Search
CPC .. B60N 2/002; G05D 1/0033; G06F 3/04817; G06F 3/0488; G06K 9/00805; G07C 2009/00301; G07C 9/00309; H04Q 9/00
(Continued)

(56) References Cited

U.S. PATENT DOCUMENTS

2002/0025823 A1* 2/2002 Hara .................. G07C 9/00309
455/456.5
2004/0227642 A1* 11/2004 Giles ...................... B60R 25/04
340/12.23
(Continued)

FOREIGN PATENT DOCUMENTS

| CN | 101132964 A | 2/2008 |
| CN | 202689781 U | 1/2013 |

(Continued)

OTHER PUBLICATIONS

International Searching Authority, "International Search Report," issued in connection with International Patent Application No. PCT/JP2016/087993, dated Mar. 14, 2017.
(Continued)

*Primary Examiner* — Yong Hang Jiang
(74) *Attorney, Agent, or Firm* — Foley & Lardner LLP

(57) ABSTRACT

A vehicle entry system that comprises a portable terminal and an onboard device that wirelessly communicates with the portable terminal. The onboard device has: a door opening and closing unit that can lock a vehicle door in a closed state and open the vehicle door to a prescribed angle; and an onboard control unit that, on the basis of commands from a portable terminal, controls a vehicle drive system and the door opening and closing unit. The portable terminal has a touch panel and a terminal control unit that outputs commands to the onboard control unit. A plurality of icons on the touch panel include an advance-and-open-door icon to advance to a location at which the door can open and, after
(Continued)

advancing, to open the door; and a reverse-and-open-door icon to reverse to a location at which the door can open and, after reversing, to open the door.

13 Claims, 16 Drawing Sheets

(51) Int. Cl.
    *G06F 3/0488* (2022.01)
    *G06K 9/00* (2022.01)
    *B60N 2/00* (2006.01)
    *G05D 1/00* (2006.01)
    *G06F 3/04817* (2022.01)
    *G06V 20/58* (2022.01)

(52) U.S. Cl.
    CPC ........ *G06F 3/0488* (2013.01); *G06F 3/04817* (2013.01); *G06V 20/58* (2022.01); *G07C 2009/00301* (2013.01)

(58) Field of Classification Search
    USPC .......................................................... 340/5.72
    See application file for complete search history.

(56) References Cited

U.S. PATENT DOCUMENTS

| | | | | |
|---|---|---|---|---|
| 2007/0203618 | A1* | 8/2007 | McBride | B60R 25/24 |
| | | | | 701/2 |
| 2010/0274414 | A1 | 10/2010 | Park | |
| 2011/0218709 | A1* | 9/2011 | Hermann | B60R 25/24 |
| | | | | 701/45 |
| 2012/0015629 | A1* | 1/2012 | Olsen | H04W 12/08 |
| | | | | 455/411 |
| 2014/0032031 | A1* | 1/2014 | Okamura | G05D 1/021 |
| | | | | 701/23 |
| 2014/0077931 | A1 | 3/2014 | Cho | |
| 2014/0222252 | A1* | 8/2014 | Matters | G05D 1/0011 |
| | | | | 701/2 |
| 2014/0244073 | A1 | 8/2014 | Okamura et al. | |
| 2015/0283886 | A1* | 10/2015 | Nania | E05F 15/73 |
| | | | | 296/146.4 |
| 2015/0375741 | A1 | 12/2015 | Kiriya | |
| 2017/0120866 | A1 | 5/2017 | Li et al. | |
| 2018/0050689 | A1* | 2/2018 | Unveren | B62D 15/0285 |
| 2020/0086852 | A1* | 3/2020 | Krekel | B60W 50/14 |

FOREIGN PATENT DOCUMENTS

| | | | |
|---|---|---|---|
| CN | 103679868 A | 3/2014 | |
| CN | 103770747 A | 5/2014 | |
| CN | 103879403 A | 6/2014 | |
| CN | 104420716 A | 3/2015 | |
| CN | 105882603 A | 8/2016 | |
| DE | 102008041354 A1 * | 2/2010 | ............. E05F 15/42 |
| JP | 2007-177476 A | 7/2007 | |
| JP | 2008-015839 A | 1/2008 | |
| JP | 2008015839 A * | 1/2008 | |
| JP | 2013-049952 A | 3/2013 | |
| JP | 2016-007959 A | 1/2016 | |
| JP | 2016007959 A * | 1/2016 | |
| JP | 2016-054382 A | 4/2016 | |
| WO | WO-2007/122704 A1 | 11/2007 | |
| WO | WO-2012/124085 A1 | 9/2012 | |

OTHER PUBLICATIONS

International Searching Authority, "Written Opinion," issued in connection with International Patent Application No. PCT/JP2016/087993, dated Mar. 14, 2017.

Extended European Search Report dated Jun. 30, 2020 for corresponding European Patent Application No. 16924800.2.

\* cited by examiner

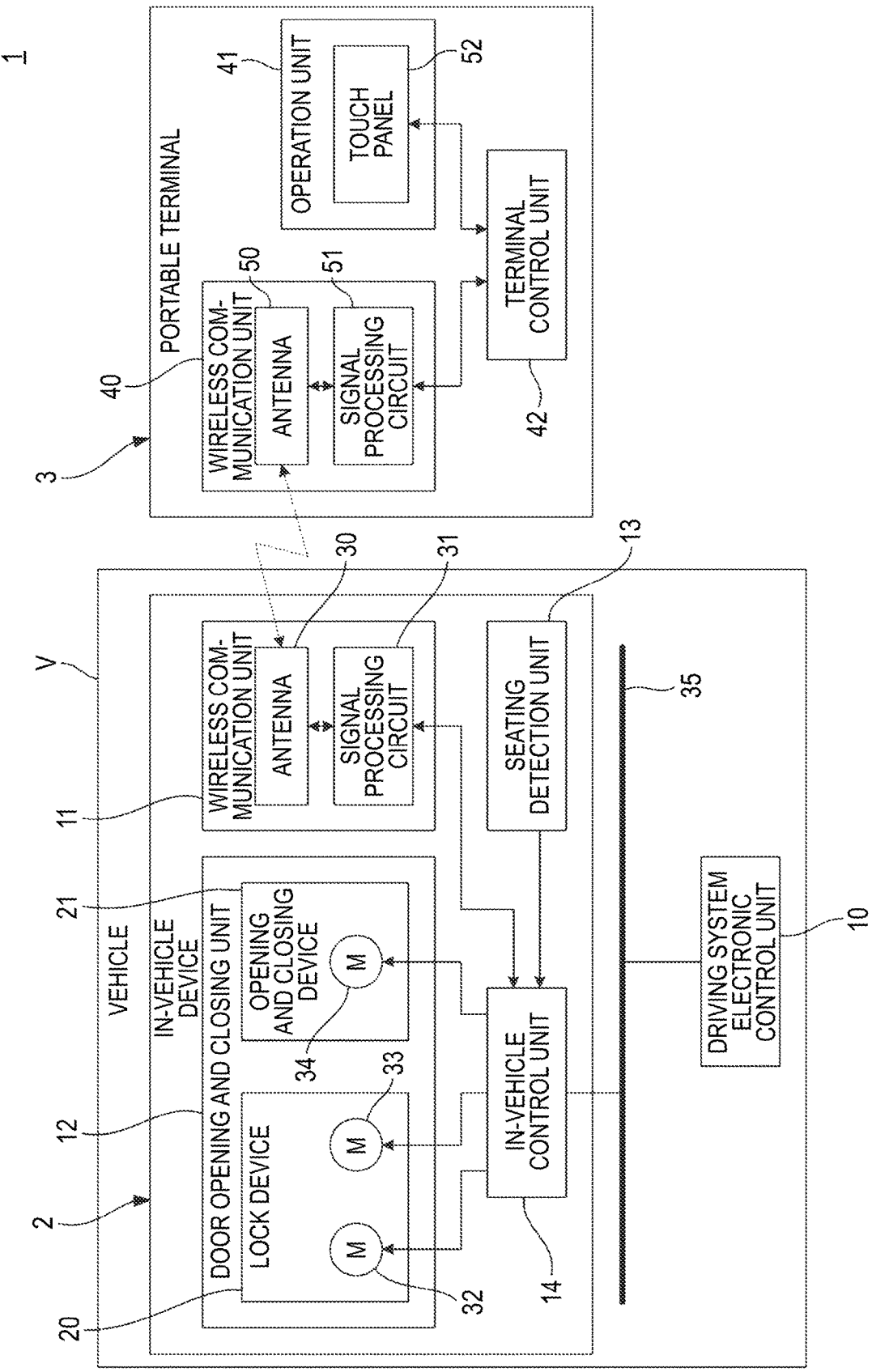

[FIG. 2]
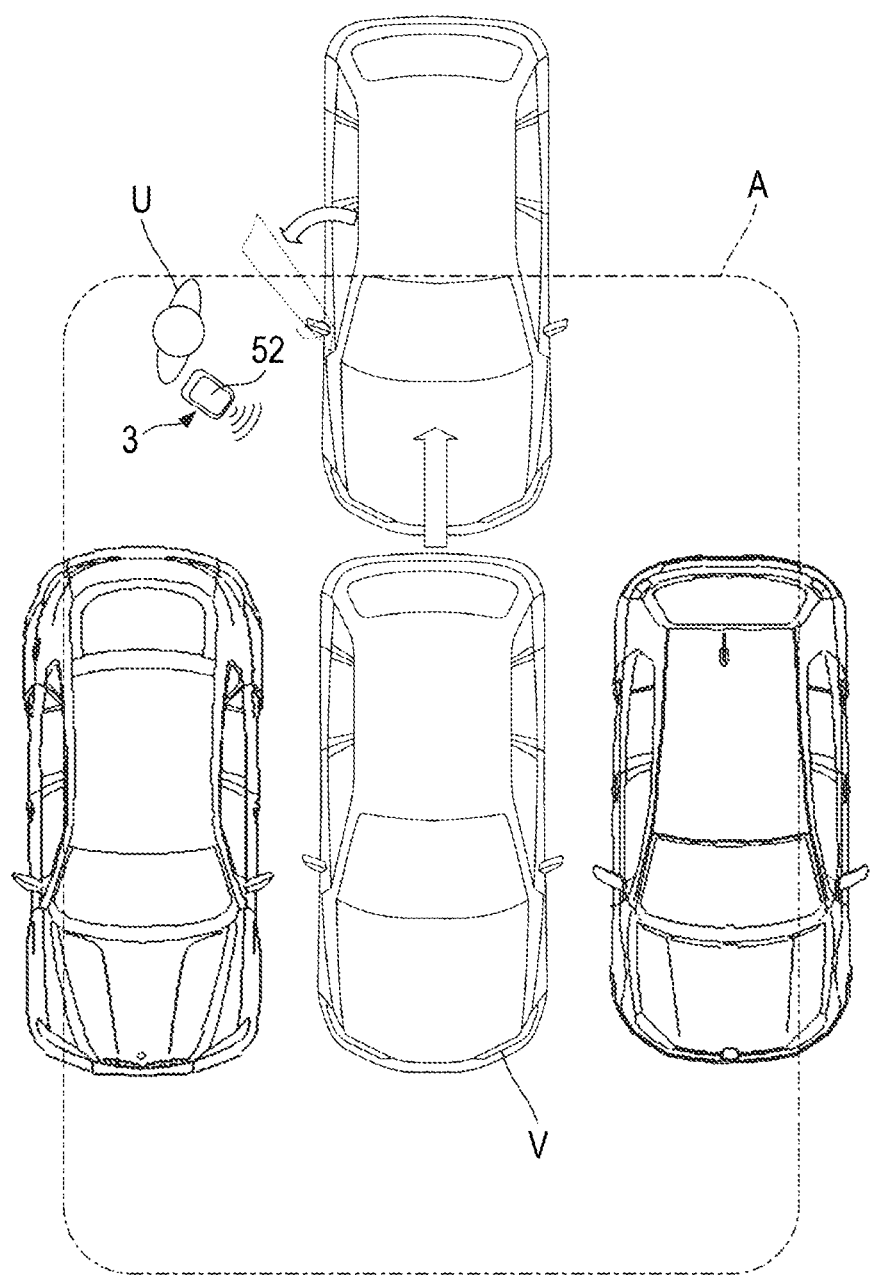

[FIG. 3]
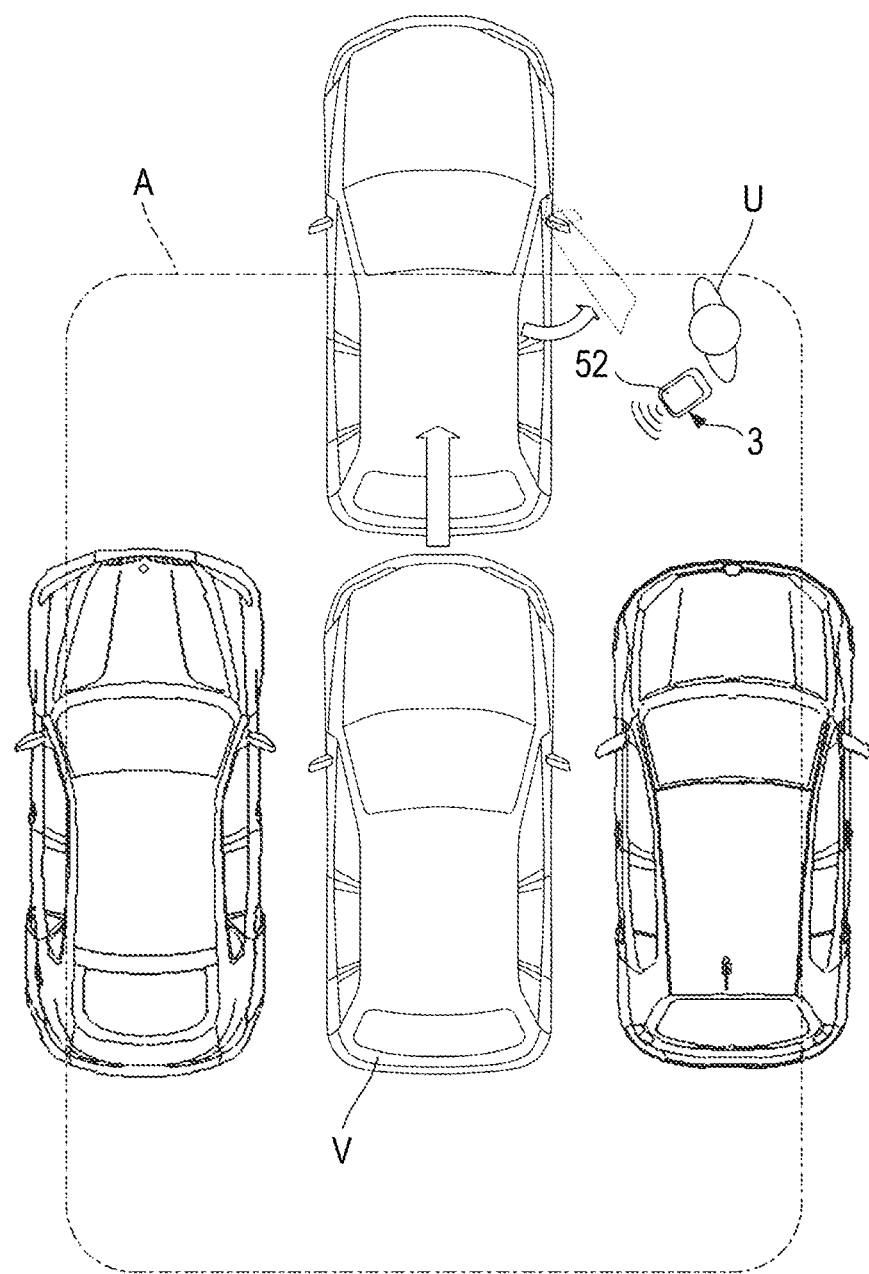

[FIG. 4]
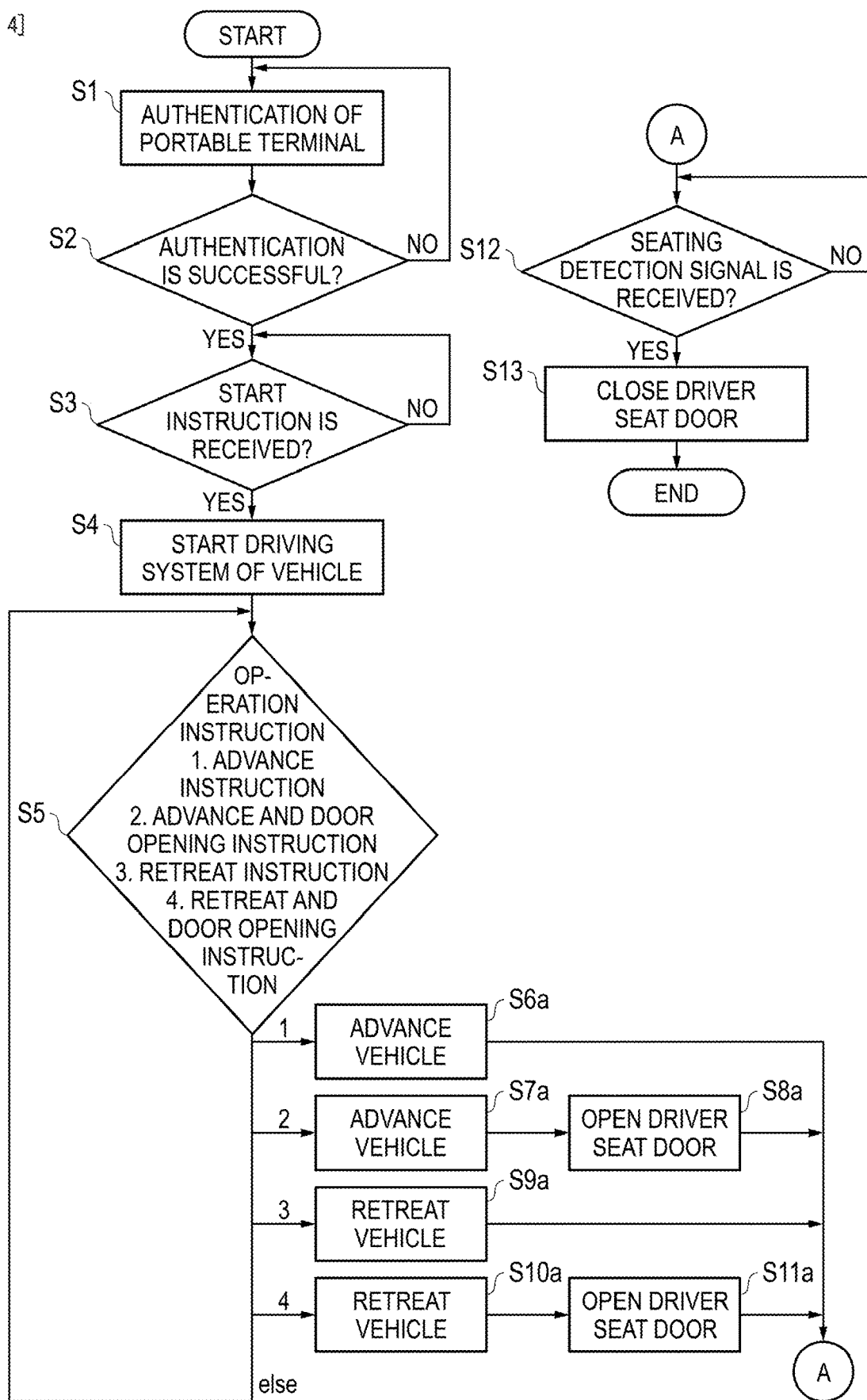

[FIG. 5A]
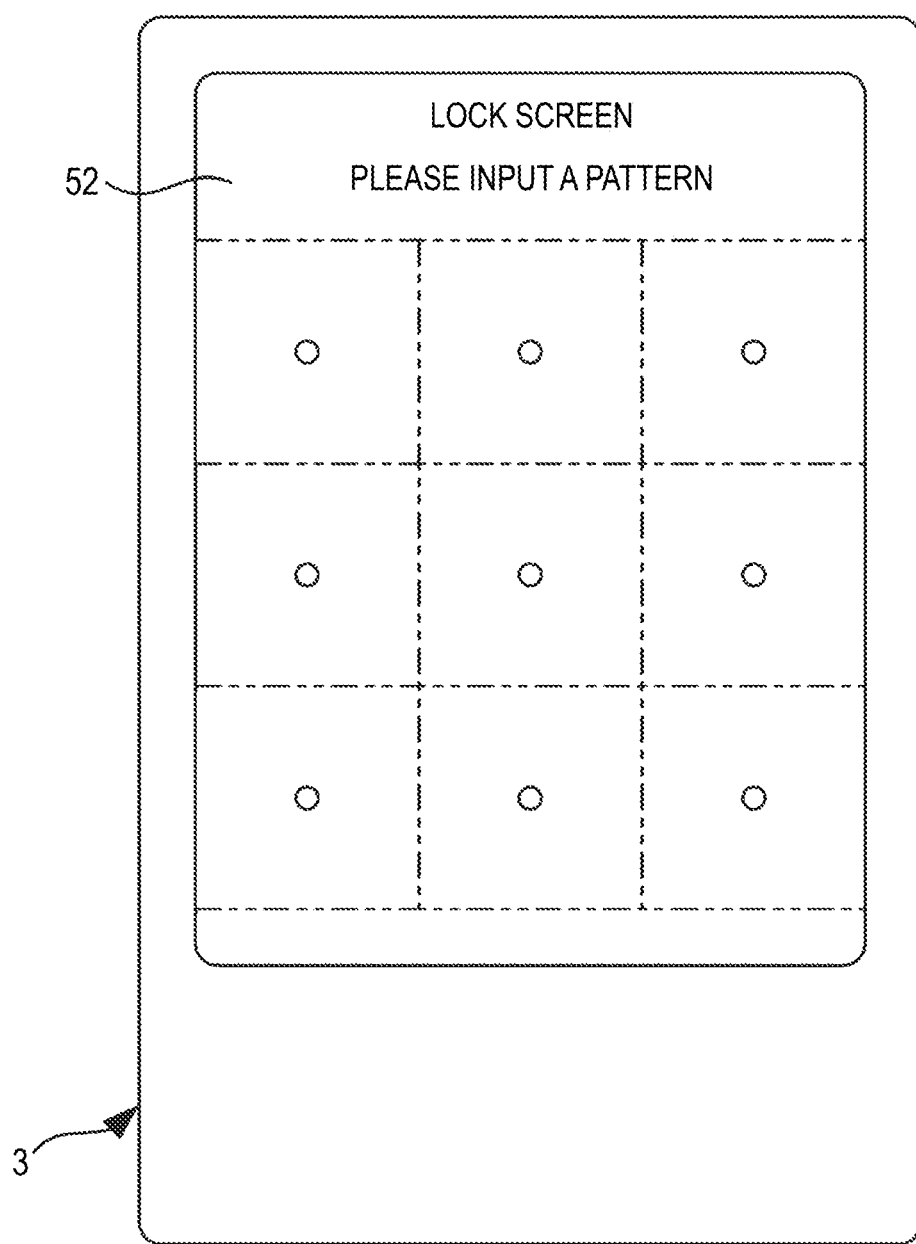

[FIG. 5B]
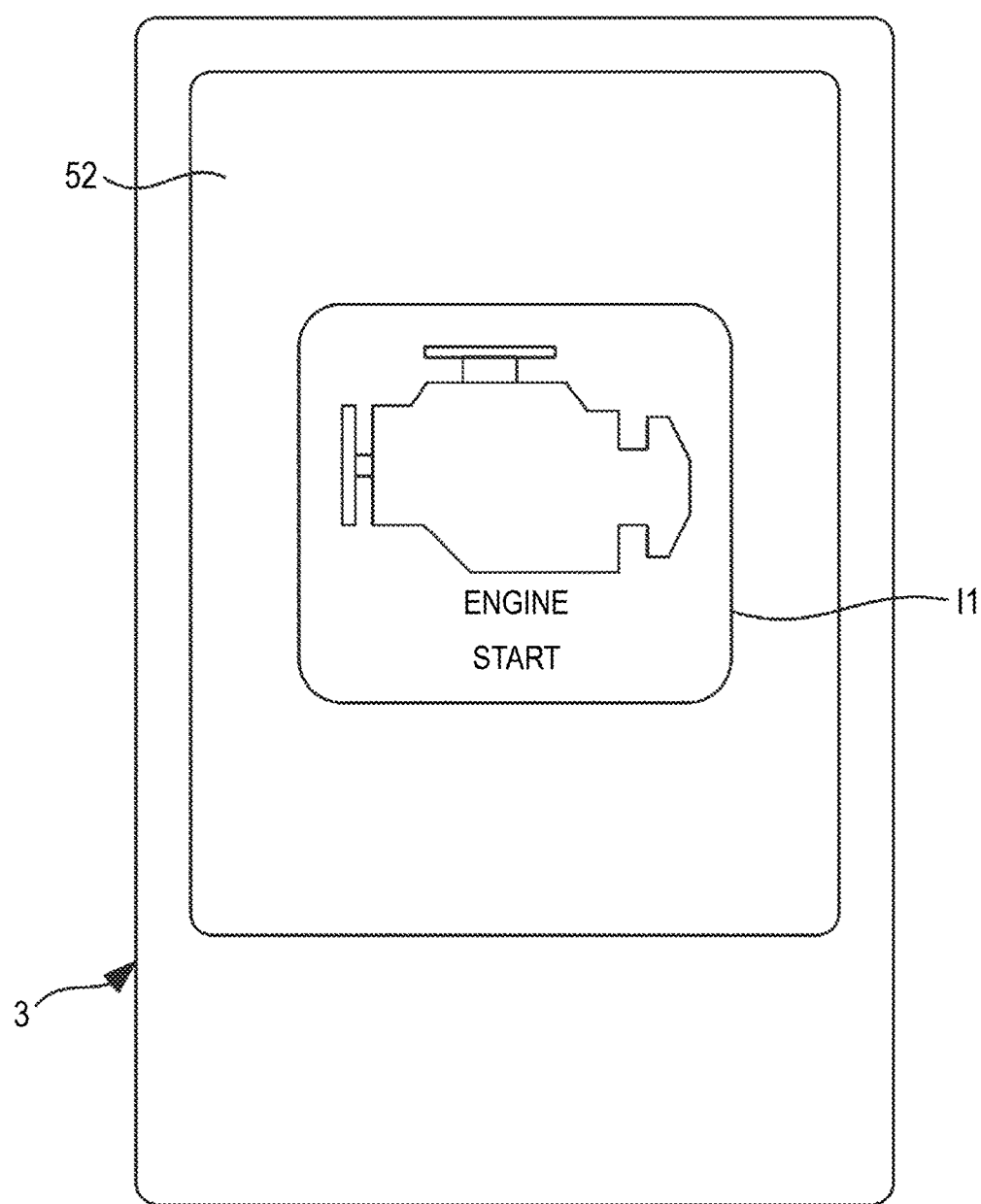

[FIG. 5C]
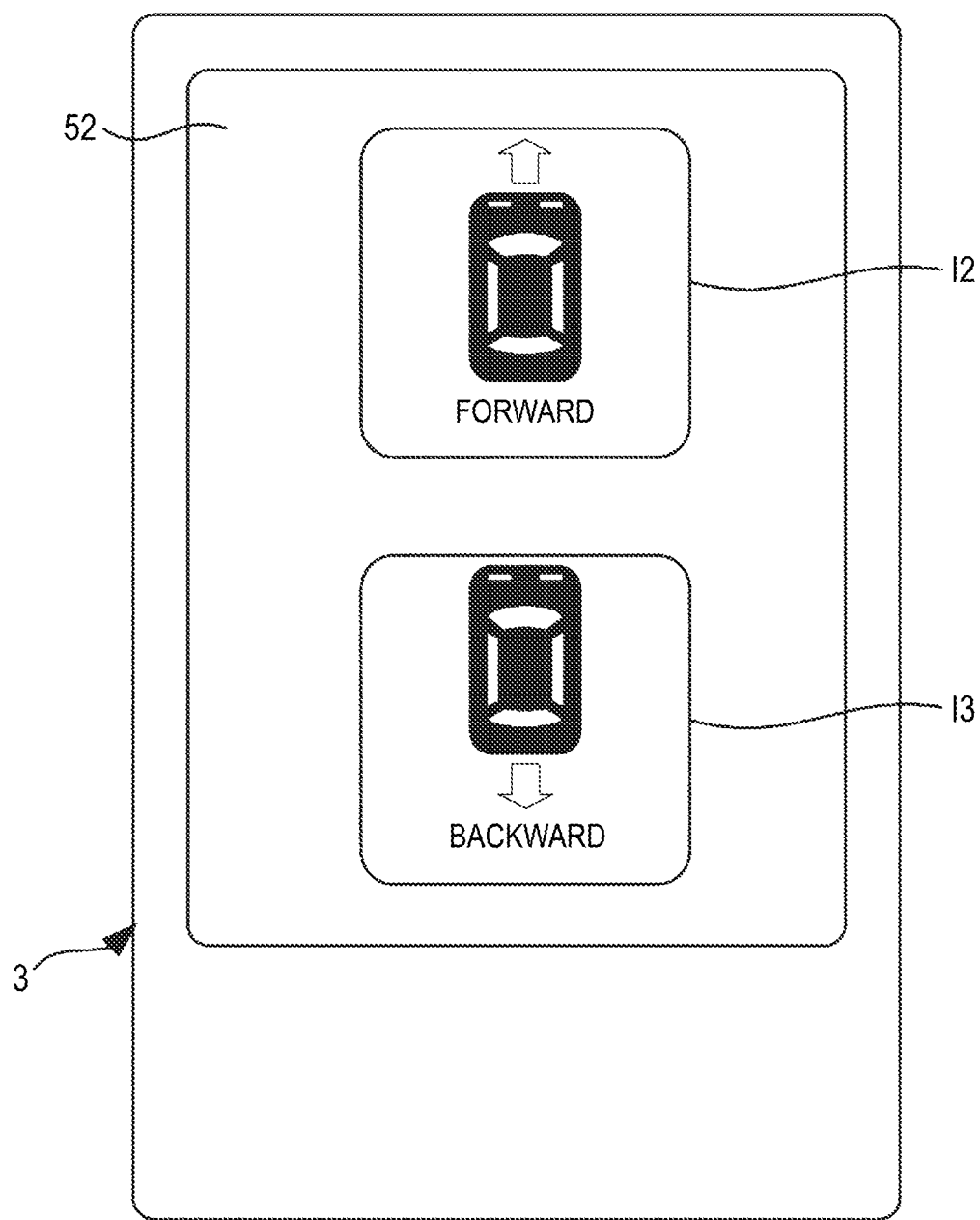

[FIG. 5D]
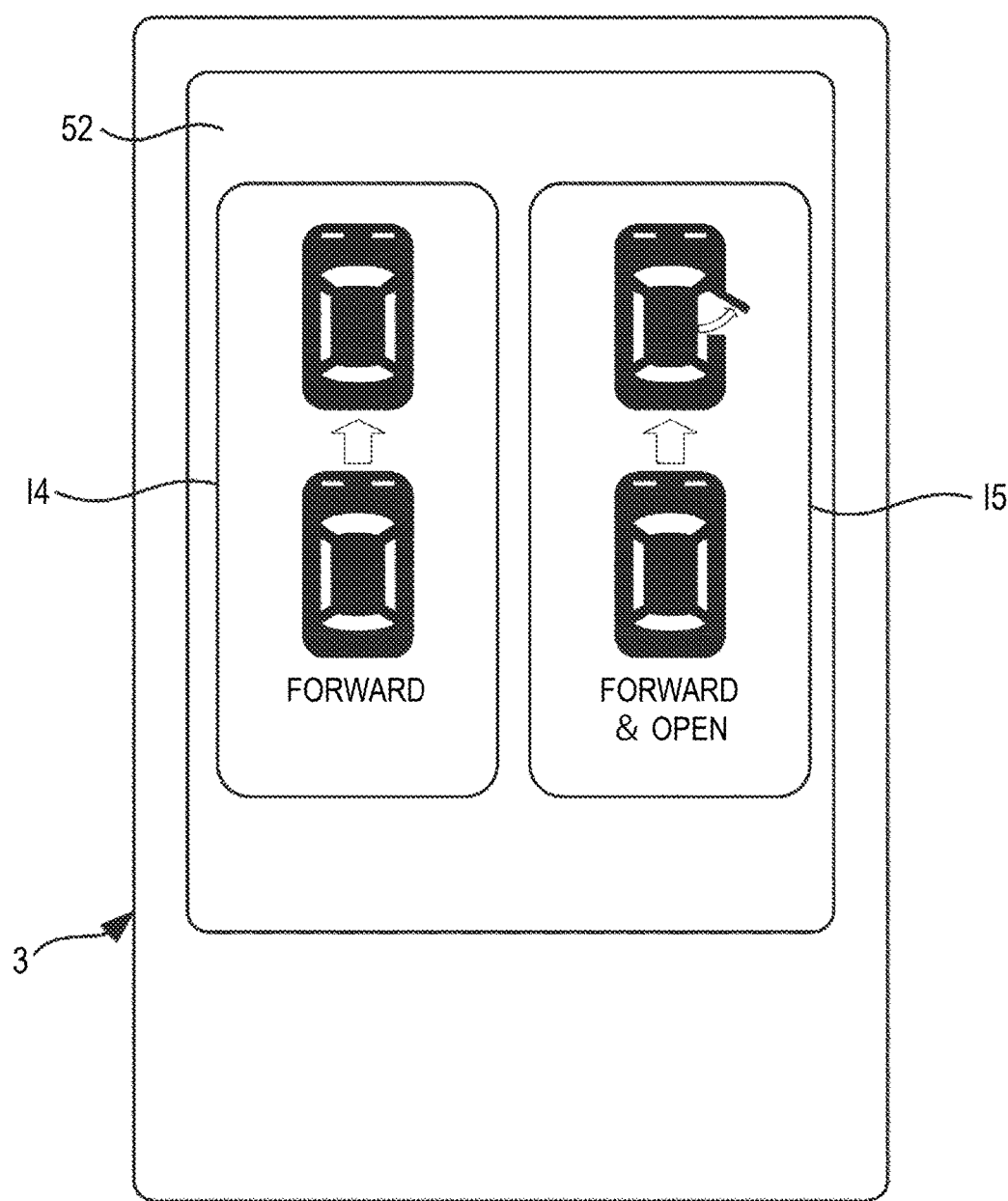

[FIG. 5E]
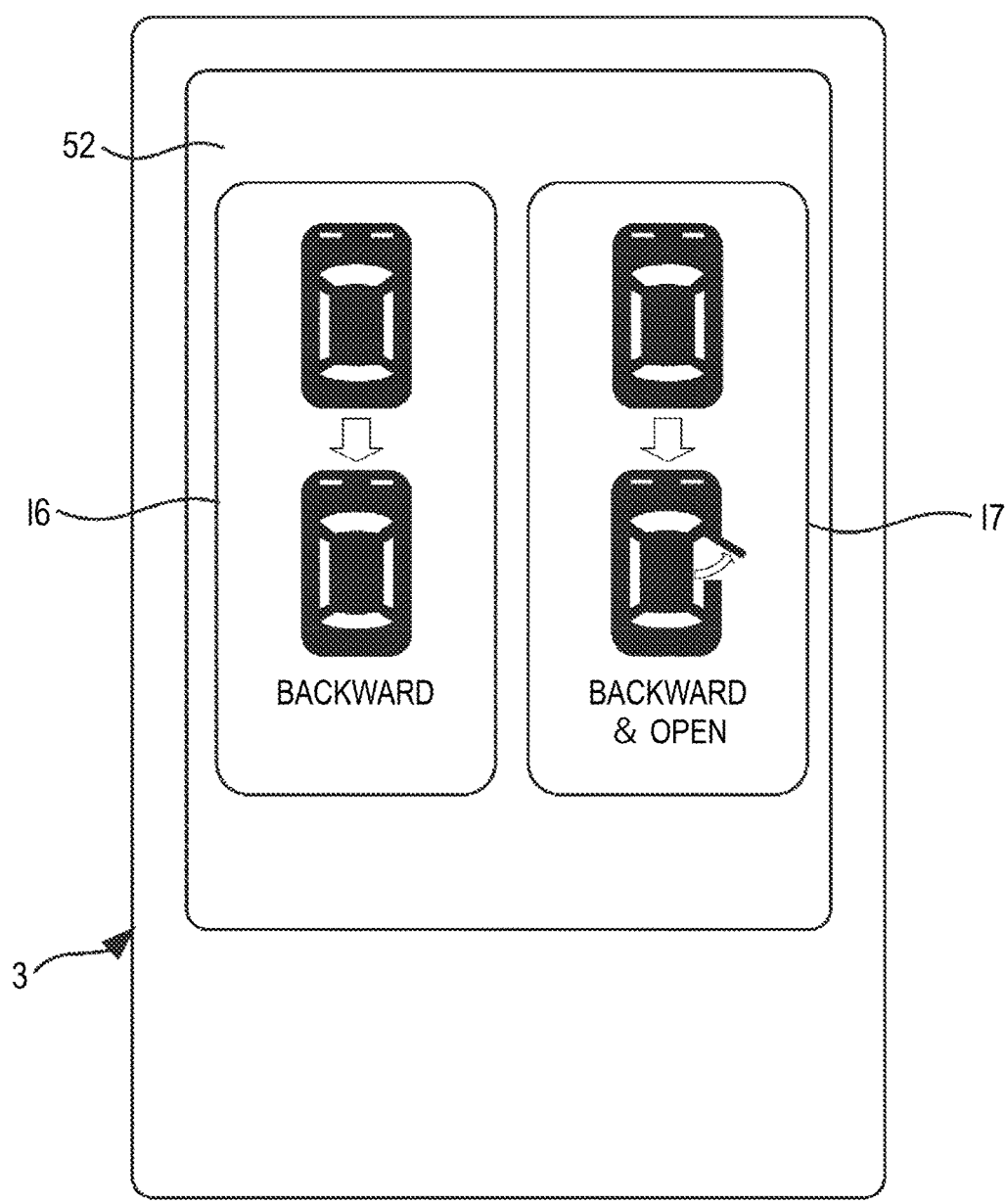

[FIG. 6]
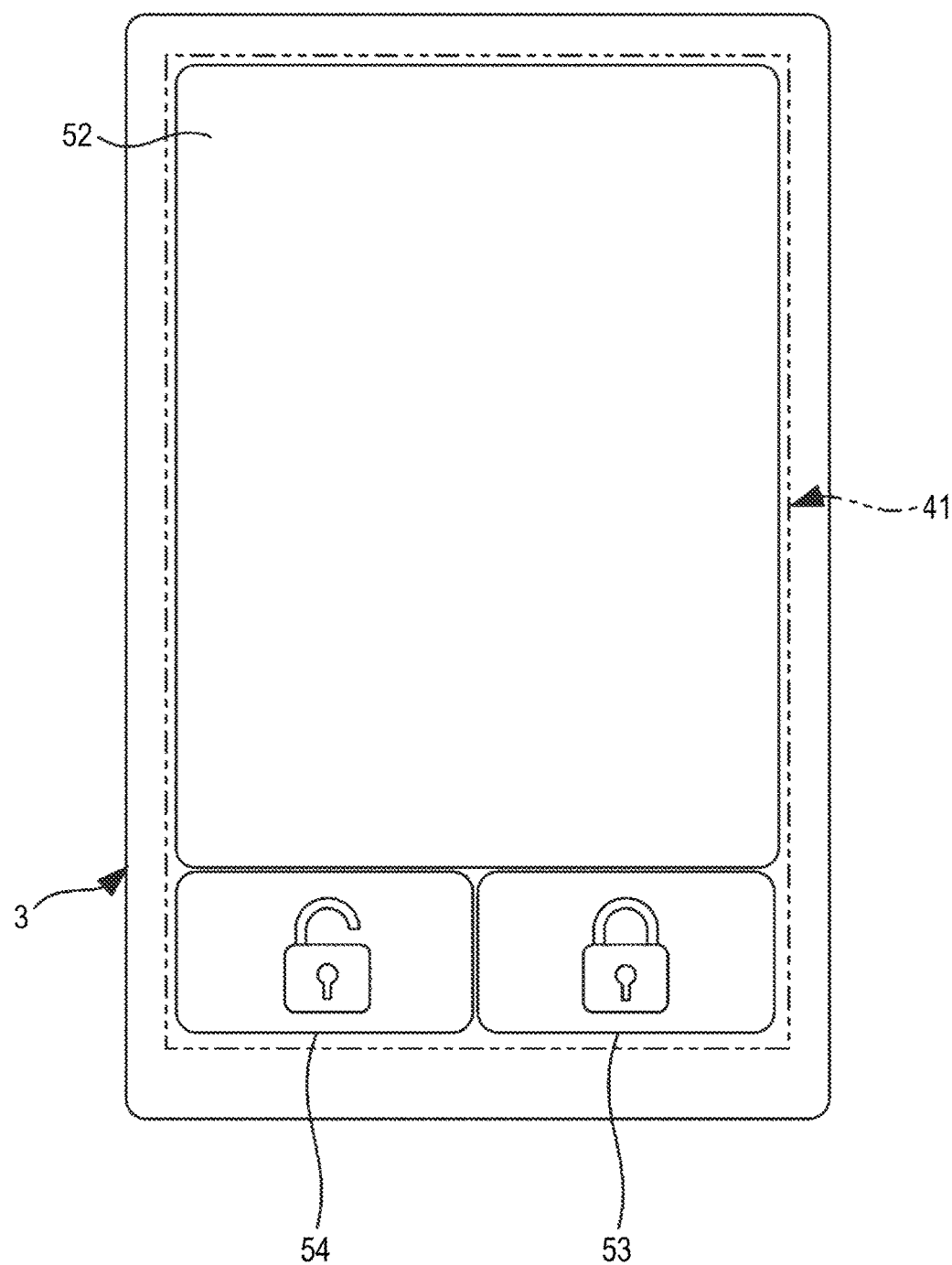

[FIG. 7]
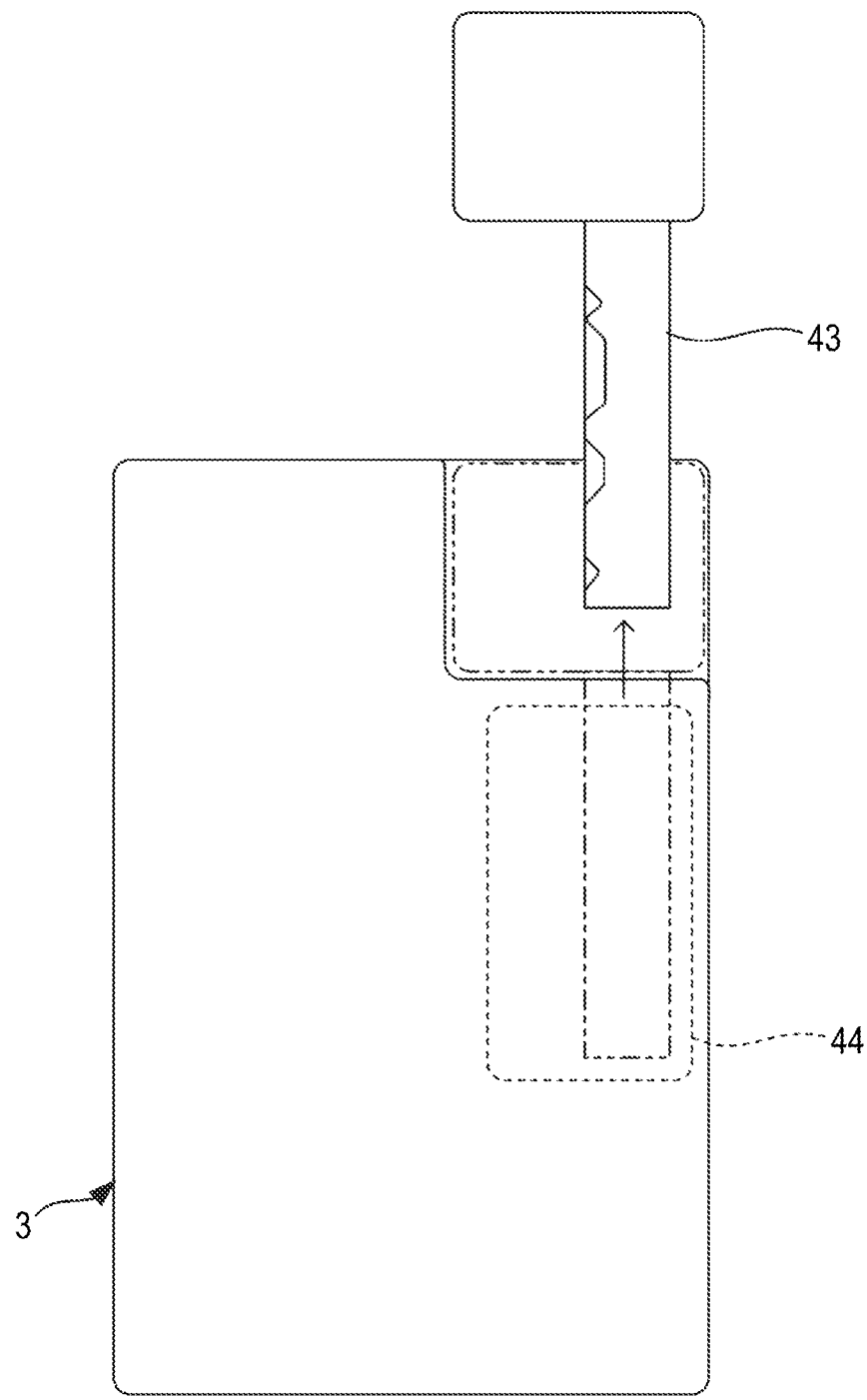

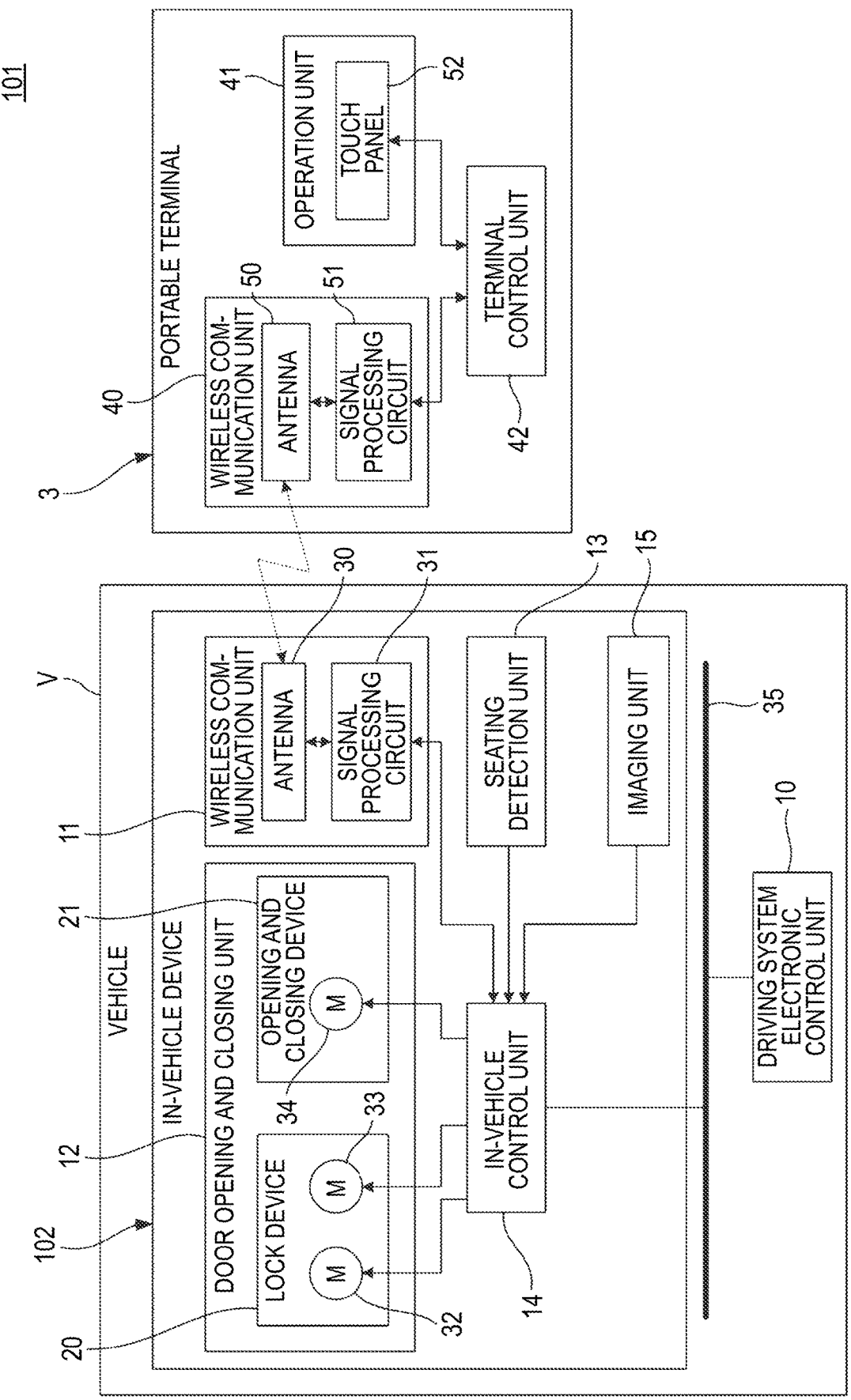
[FIG. 8]

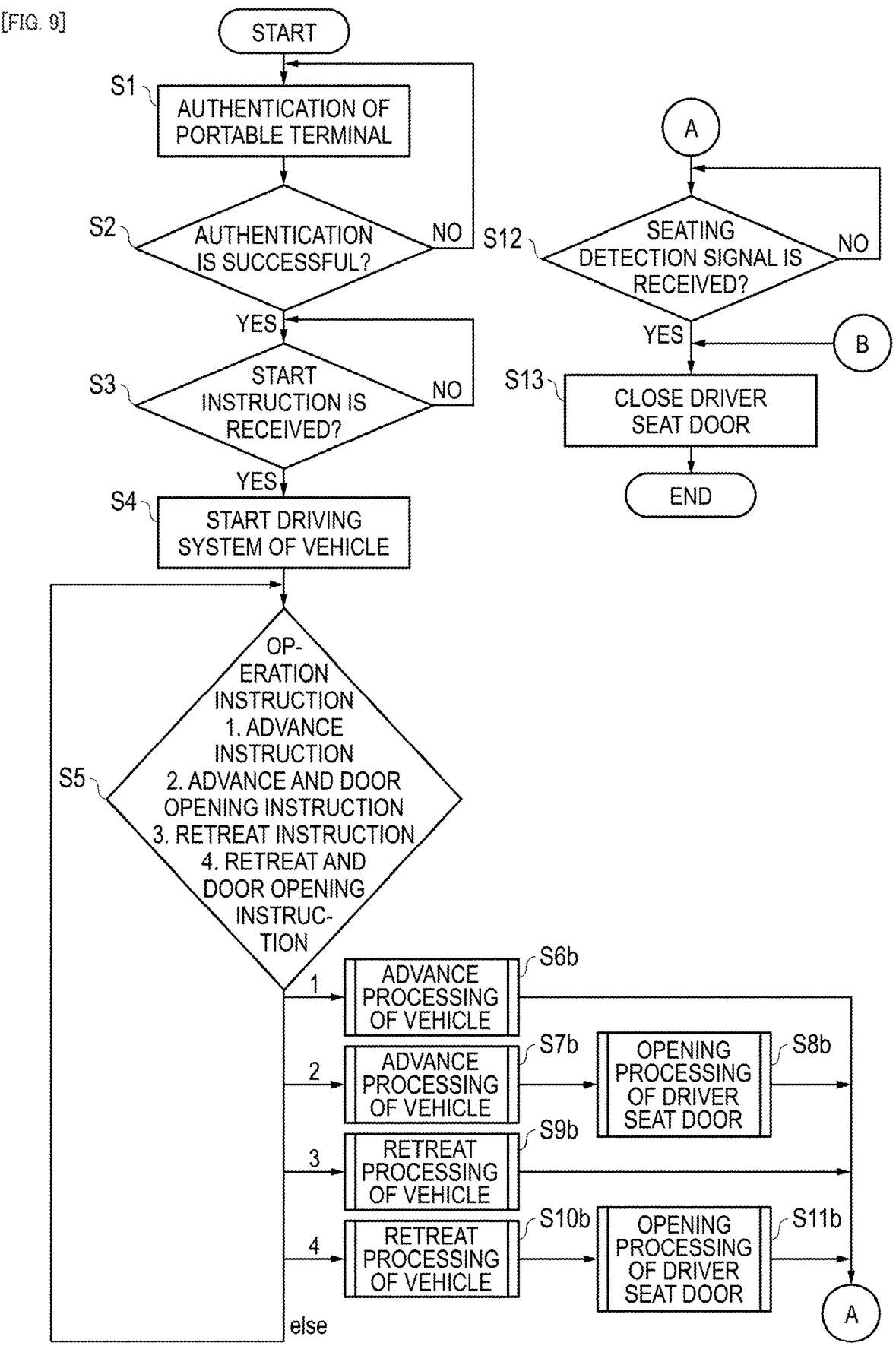
[FIG. 9]

[FIG. 10]
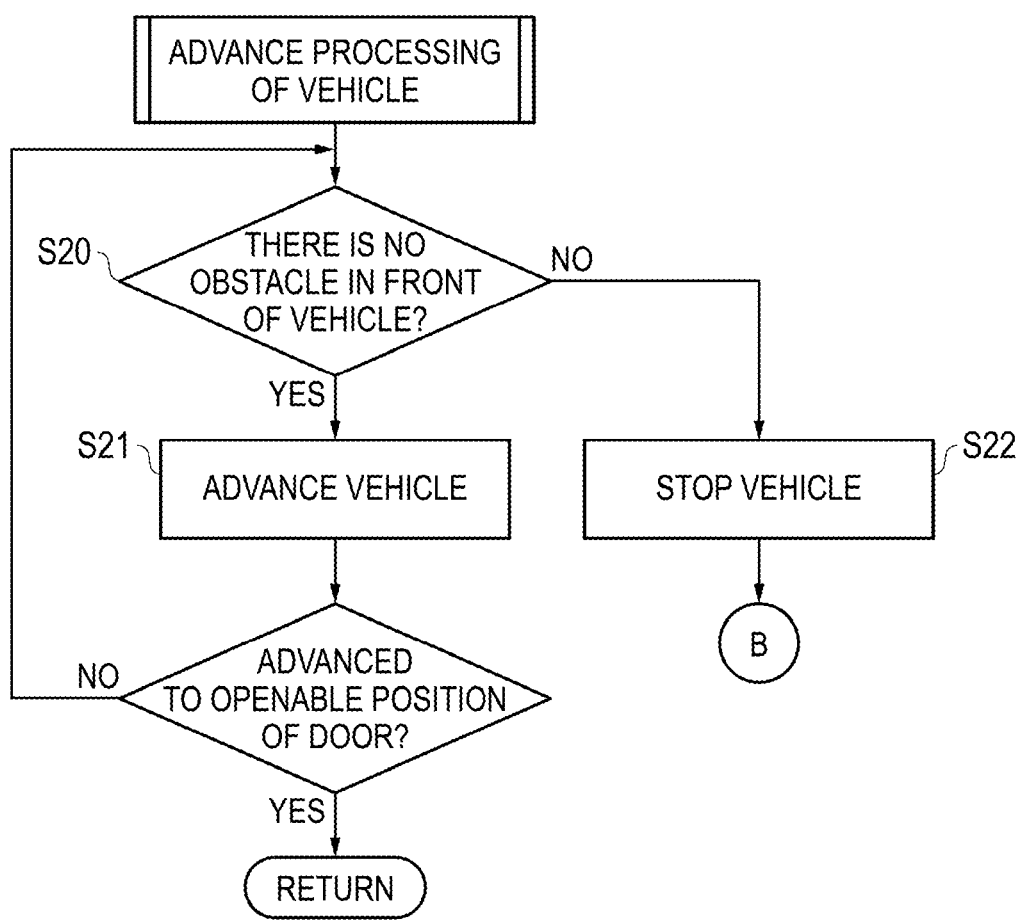

[FIG. 11]
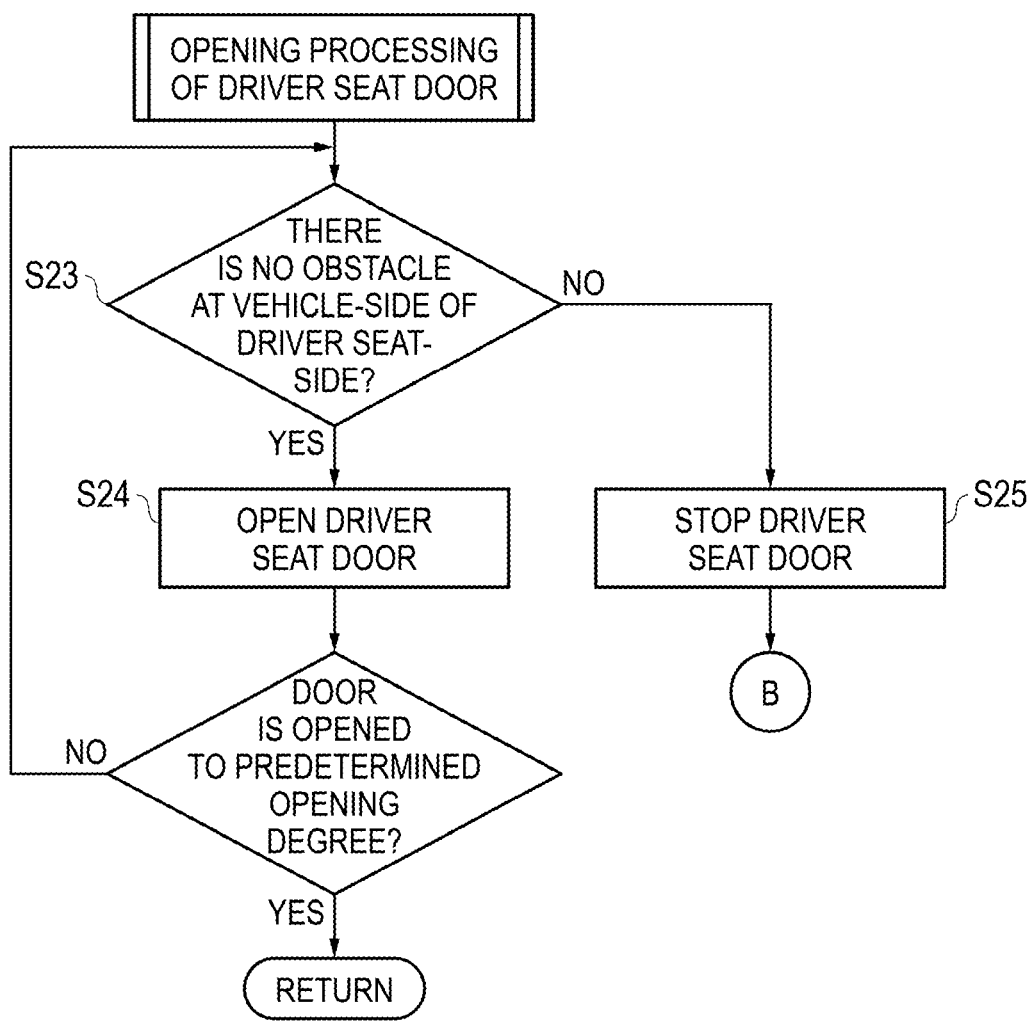

[FIG. 12]
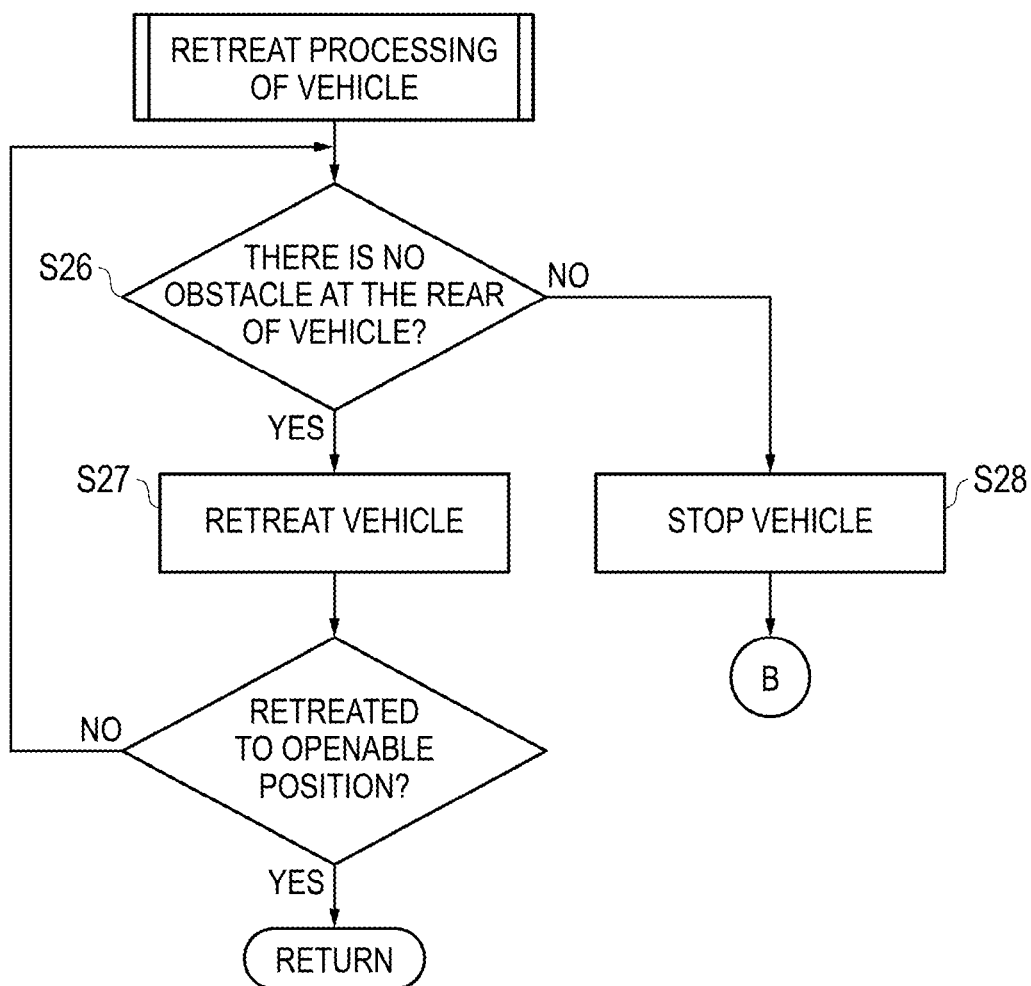

tion No. PCT/JP2016/087993, filed Dec. 20, 2016. The content of this application is hereby incorporated by reference in its entirety.

VEHICLE ENTRY SYSTEM AND ONBOARD DEVICE

RELATED APPLICATION

The present application claims priority under 37 U.S.C. § 371 to International Patent Application No. PCT/JP2016/087993, filed Dec. 20, 2016. The content of this application is hereby incorporated by reference in its entirety.

TECHNICAL FIELD

The present invention relates to a vehicle entry system and an in-vehicle device.

BACKGROUND ART

There has been known a system, which includes an in-vehicle device mounted in a vehicle such as an automobile and a portable terminal configured to perform wireless communication with the in-vehicle device, and which is configured to remotely control the vehicle by the portable terminal (for example, refer to PTL 1).

In the remote control system disclosed in PTL 1, when proximity wireless communication between the in-vehicle device and the portable terminal is performed through an antenna provided at a front part of the vehicle, the vehicle is moved rearwards, and when the proximity wireless communication is performed through an antenna provided at a rear part of the vehicle, the vehicle is moved forwards.

CITATION LIST

Patent Literature

PTL 1: JP-A-2016-54382

SUMMARY OF INVENTION

Technical Problem

In the remote control system disclosed in PTL 1, the vehicle is moved in a direction of getting away from a user who carries the portable terminal. In order to take out the parked vehicle from a parking space by the remote control system and to get in the vehicle, the user should come around behind the vehicle, which causes inconvenience. Also, it is assumed that there is a case where the user cannot come around behind the vehicle, such as a vehicle parked in a narrow space.

The present invention has been made in view of the above situations, and an object thereof is to improve user's convenience when getting in a vehicle.

Solution to Problem

A vehicle entry system of one aspect of the present invention comprises: a portable terminal; and an in-vehicle device configured to perform wireless communication with the portable terminal, wherein the in-vehicle device comprises: a door opening and closing unit configured to lock a door of a vehicle at a closed state and to open the door to a predetermined opening degree; and an in-vehicle control unit configured to authenticate the portable terminal and to control a driving system of the vehicle and the door opening and closing unit on the basis of an instruction to be transmitted from the authenticated portable terminal, wherein the portable terminal comprises: an operation unit comprising a touch panel; and a terminal control unit configured to output an instruction to the in-vehicle control unit on the basis of an operation on the operation unit, and wherein the touch panel is displayed thereon with a plurality of icons comprising: a start icon for instructing start of the driving system of the vehicle; an advance icon for instructing advance to an openable position of the door; an advance and door opening icon for instructing advance to the openable position of the door and opening of the door by the door opening and closing unit after the advance; a retreat icon for instructing retreat to the openable position of the door; and a retreat and door opening icon for instructing retreat to the openable position of the door and opening of the door by the door opening and closing unit after the retreat.

Further, a vehicle entry system of another aspect of the present invention comprises a portable terminal; and an in-vehicle device configured to perform wireless communication with the portable terminal, wherein the in-vehicle device comprises: a door opening and closing unit configured to lock a driver seat door of the vehicle at a closed state and to open the driver seat door to a predetermined opening degree; and an in-vehicle control unit configured to authenticate the portable terminal and to control a driving system of the vehicle and the door opening and closing unit on the basis of an instruction to be transmitted from the authenticated portable terminal, wherein the portable terminal comprises: an operation unit including a touch panel; and a terminal control unit configured to output an instruction to the in-vehicle control unit on the basis of an operation on the operation unit, and wherein the touch panel is configured to display: an advance and door opening icon for instructing advance to an openable position of the driver seat door and opening of the driver seat door by the door opening and closing unit after the advance; and a retreat and door opening icon for instructing retreat to the openable position of the driver seat door and opening of the driver seat door by the door opening and closing unit after the retreat.

An in-vehicle device of an aspect of the present invention is an in-vehicle device configured to perform wireless communication with a portable terminal, the in-vehicle device comprising: a door opening and closing unit configured to lock a door of a vehicle, which has the in-vehicle device mounted therein, at a closed state and to open the door to a predetermined opening degree; and an in-vehicle control unit configured to authenticate the portable terminal and to control a driving system of the vehicle and the door opening and closing unit on the basis of an instruction to be transmitted from the authenticated portable terminal, wherein in response to an instruction to be transmitted from the portable terminal, the in-vehicle control unit is configured to start a driving system of the vehicle and control the vehicle to: advance the vehicle to an openable position of the door or open the door by the door opening and closing unit after advancing the vehicle to the openable position of the door; or retreat the vehicle to the openable position of the door, or to open the door by the door opening and closing unit after retreating the vehicle to the openable position of the door.

Advantageous Effects of Invention

According to the present invention, it is possible to improve user's convenience when getting in a vehicle.

BRIEF DESCRIPTION OF DRAWINGS

FIG. 1 is a functional block diagram of an example of a vehicle entry system, which illustrates an illustrative embodiment of the present invention.

FIG. 2 is a pictorial view of an example of remote control of a vehicle implemented by the vehicle entry system of FIG. 1.

FIG. 3 is a pictorial view of another example of remote control of the vehicle implemented by the vehicle entry system of FIG. 1.

FIG. 4 is a flowchart of processing to be executed by an in-vehicle control unit of the vehicle entry system of FIG. 1.

FIG. 5A is a pictorial view of an operation screen to be displayed on a touch panel of a portable terminal of the vehicle entry system of FIG. 1.

FIG. 5B is a pictorial view of an operation screen to be displayed on the touch panel of the portable terminal of the vehicle entry system of FIG. 1.

FIG. 5C is a pictorial view of an operation screen to be displayed on the touch panel of the portable terminal of the vehicle entry system of FIG. 1.

FIG. 5D is a pictorial view of an operation screen to be displayed on the touch panel of the portable terminal of the vehicle entry system of FIG. 1.

FIG. 5E is a pictorial view of an operation screen to be displayed on the touch panel of the portable terminal of the vehicle entry system of FIG. 1.

FIG. 6 is a front view of a modified embodiment of the portable terminal of the vehicle entry system of FIG. 1.

FIG. 7 is a rear view of the portable terminal of FIG. 6.

FIG. 8 is a functional block diagram of another example of a vehicle entry system, which illustrates an illustrative embodiment of the present invention.

FIG. 9 is a flowchart of processing to be executed by an in-vehicle control unit of the vehicle entry system of FIG. 8.

FIG. 10 is a flowchart of processing to be executed by the in-vehicle control unit of the vehicle entry system of FIG. 8.

FIG. 11 is a flowchart of processing to be executed by the in-vehicle control unit of the vehicle entry system of FIG. 8.

FIG. 12 is a flowchart of processing to be executed by the in-vehicle control unit of the vehicle entry system of FIG. 8.

DESCRIPTION OF EMBODIMENTS

FIG. 1 is a functional block diagram of an example of a vehicle entry system, which illustrates an illustrative embodiment of the present invention.

A vehicle entry system 1 shown in FIG. 1 includes an in-vehicle device 2 mounted in a vehicle V such as an automobile and a portable terminal 3 carried by a user of the vehicle, and is configured to authenticate the portable terminal 3 by the in-vehicle device 2 through wireless communication between the in-vehicle device 2 and the portable terminal 3 and to remotely control the vehicle V by the authenticated portable terminal 3.

First, the vehicle V has a driving system electronic control unit 10. The driving system electronic control unit 10 is configured to control a driving engine, a powertrain mechanism, a steering mechanism, a braking mechanism and the like of the vehicle. The driving engine is an engine configured to generate a driving force necessary to drive the vehicle V, and is an internal combustion engine and an electric motor, for example. The powertrain mechanism is a mechanism configured to transmit the driving force generated from the driving engine to driving wheels of the vehicle V. The steering mechanism is a mechanism configured to change an angle (steering angle) of steered wheels of the vehicle V. The braking mechanism is a mechanism configured to generate a braking force in the vehicle V.

The in-vehicle device 2 includes a wireless communication unit 11, a door opening and closing unit 12, a seating detection unit 13 and an in-vehicle control unit 14.

The wireless communication unit 11 includes an antenna 30 and a signal processing circuit 31, and is configured to transmit and receive information to and from the portable terminal 3 by using wireless communication. A communicable distance of the wireless communication unit 11 is preferably 1 m to several meters, and as a wireless communication method configured to secure the communicable distance, an NFC (Near Field Communication) method prescribed in ISO/IEC21418, a Bluetooth (registered trademark) method prescribed in IEEE 802.15 and the like may be exemplified.

The antenna 30 is configured to transmit and receive a signal including information, is provided at one place or dispersed places such as a front grill, a rear frame, a pillar and the like of the vehicle V, and is configured to form a communicable area having the communicable distance around the vehicle V. The signal processing circuit 31 is configured to restore information included in a received signal by performing signal processing such as demodulation for a signal received by the antenna 30 and to generate a signal to be transmitted from the antenna 30 by performing signal processing such as modulation for information to be transmitted to the portable terminal 3. The information included in the signal received by the antenna 30 is restored by the signal processing circuit 31 and is then output to the in-vehicle control unit 14.

The door opening and closing unit 12 includes a lock device 20 and an opening and closing device 21, and is configured to lock a vehicle door at a closed state and to open the vehicle door to a predetermined opening degree.

The lock device 20 includes a latch mechanism, a disengaging mechanism and a locking and unlocking mechanism and is mounted to the vehicle door, like a general lock device of the vehicle door.

The latch mechanism is configured to engage a latch to a striker provided in a vehicle body, to restrain the striker by engaging a ratchet to the latch and to hold the vehicle door at the closed state.

The disengaging mechanism is configured to disengage the engagement between the latch and the ratchet and to enable the vehicle door to be opened. The disengaging mechanism has an open lever linked to a door handle provided at the vehicle door. The open lever is configured to operate in correspondence to a door opening operation of the door handle, and the ratchet is configured to move from an engaging position to a disengaging position in correspondence to an operation of the open lever.

The locking and unlocking mechanism can switch between an unlock state where the door handle and the open lever are linked and a lock state where the linkage between the door handle and the open lever is disconnected, and is configured to invalidate the door opening operation of the door handle at the lock state and to lock the door at the closed state. The locking and unlocking mechanism includes a lock lever linked to a key cylinder provided in the vehicle door. The lock lever is configured to operate in correspondence to an unlocking operation and a locking operation of the key cylinder, so that the door handle and the open lever are linked and the linkage between the door handle and the open lever is disconnected. The locking and unlocking mechanism further includes a motor 32 configured to operate the lock lever. The lock lever is configured to operate in correspondence to rotation of the motor 32, like the unlocking operation and the locking operation of the key cylinder.

The lock device 20 further includes a motor 33 configured to operate the open lever of the disengaging mechanism. The open lever is configured to operate in correspondence to rotation of the motor 33 and the ratchet is configured to move from the engaging position to the disengaging position without the door opening operation of the door handle, so that the vehicle door can be opened. As the lock device configured to disengage the engagement between the latch and the ratchet by using the motor, a lock device disclosed in Japanese Patent Application Publication No. 2012-92516A can be used, for example.

The opening and closing device 21 includes a main body having a motor 34, and an output arm. The main body is attached to the vehicle body and the output arm is connected to the vehicle door. The output arm is configured to rotate in correspondence to rotation of the motor 34, so that the vehicle door is opened and closed. As the opening and closing device configured to open and close the vehicle door by using the motor, an opening and closing device disclosed in Japanese Patent Application Publication No. 2005-320784A can be used, for example.

The vehicle door configured to be locked/unlocked and opened/closed by the door opening and closing unit 12 is not particularly limited. However, a driver seat door and a front passenger seat door of the vehicle V are favorable, and the driver seat door is particularly favorable.

The seating detection unit 13 is provided in a seat equipped in the vicinity of the vehicle door configured to be locked/unlocked and opened/closed by the door opening and closing unit 12 and is configured to detect passenger's seating on the seat. As the seating detection unit 13, a pressure sensor and the like can be used, for example. When the seating detection unit 13 detects the passenger's seating, it outputs a seating detection signal to the in-vehicle control unit 14.

The in-vehicle control unit 14 is mainly configured by a well-known microcomputer having a ROM (Read Only Memory), a RAM (Random Access Memory) and a CPU (Central Processing Unit). In the ROM, an application program to be executed by the CPU, authentication information to be used for authentication of the portable terminal 3, and the like are stored.

The in-vehicle control unit 14 configured to operate in accordance with the application program is configured to control the wireless communication unit 11 (the signal processing circuit 31) and to transmit and receive information between the in-vehicle device 2 and the portable terminal 3. Also, the in-vehicle control unit 14 is configured to control the door opening and closing unit 12 (the motors 32, 33, 34) on the basis of the information received from the portable terminal 3 and the seating detection signal output from the seating detection unit 13, thereby configured to lock/unlock and open/close the vehicle door. Furthermore, the in-vehicle control unit 14 is connected to the driving system electronic control unit 10 via a communication bus 35 and is configured to control the driving system of the vehicle V by using functions of the driving system electronic control unit 10.

The portable terminal 3 includes a wireless communication unit 40, an operation unit 41, and a terminal control unit 42.

The wireless communication unit 40 includes an antenna 50 and a signal processing circuit 51 and is configured to transmit and receive the information to and from the in-vehicle device 2 by using wireless communication. The antenna 50 is configured to transmit and receive a signal including the information, and the signal processing circuit 51 is configured to restore the information included in a received signal by performing signal processing such as demodulation for the signal received by the antenna 50 and to generate a signal to be transmitted from the antenna 50 by performing signal processing such as modulation for the information to be transmitted to the in-vehicle device 2. The information included in the signal received by the antenna 50 is output to the terminal control unit 42 after being restored by the signal processing circuit 51.

The operation unit 41 includes a touch panel 52. The touch panel 52 is configured to display an operation screen, and outputs an operation detection signal to the terminal control unit 42 when an operation on the touch panel 52 is detected.

The terminal control unit 42 is mainly configured by a well-known microcomputer having a ROM, a RAM and a CPU. In the ROM, an application program to be executed by the CPU, terminal identification information to be used for authentication of the portable terminal 3, and the like are stored.

The terminal control unit 42 configured to operate in accordance with the application program is configured to transmit and receive the information between the in-vehicle device 2 and the portable terminal 3 by controlling the wireless communication unit 40 (the signal processing circuit 51). Also, the terminal control unit 42 is configured to control the screen display of the touch panel 52 of the operation unit 41 and to receive an operation on the touch panel 52 at a state where the operation screen is displayed on the touch panel 52, on the basis of the operation detection signal output from the touch panel 52.

FIGS. 2 and 3 depict examples of remote control of the vehicle V implemented by the vehicle entry system 1. Meanwhile, in the below, it is assumed that the vehicle door, which is to be locked/unlocked and opened/closed by the door opening and closing unit 12, is only the driver seat door.

In the example of FIG. 2, the vehicle V is parked with facing forwards, the other vehicles are closely parked at both sides of the driver seat-side and the front passenger seat-side of the vehicle V, and the vehicle V is in a situation where all side doors including the driver seat door cannot be opened to a predetermined opening degree enough to get in the vehicle.

First, at a state where the portable terminal 3 carried by a user U is arranged in a range of a communicable area A formed around the vehicle V by the wireless communication unit 11 of the in-vehicle device 2, a predetermined operation for remotely controlling the vehicle V is performed on the touch panel 52 of the portable terminal 3 and instruction information corresponding to the operation is transmitted from the portable terminal 3 to the in-vehicle device 2 of the vehicle V. The in-vehicle control unit 14 of the in-vehicle device 2 controls the driving system of the vehicle V and the door opening and closing unit 12, based on the received instruction information.

The driving system (driving engine) of the vehicle V is enabled to start by control of the driving system of the vehicle V made by the in-vehicle control unit 14, so that the vehicle V is straightly moved rearwards. After the vehicle V is retreated to a position at which the driver seat door of the vehicle V can be opened to an opening degree (for example, 45°) enough to get in the vehicle, the vehicle V is stopped. Also, as required, the driver seat door is automatically opened to the predetermined opening degree enough to get in the vehicle by control of the door opening and closing unit 12 made by the in-vehicle control unit 14.

In the example of FIG. 3, the vehicle V is parked with facing rearwards, the other vehicles are closely parked at both sides of the driver seat-side and the front passenger seat-side of the vehicle V, and the vehicle V is in a situation where all side doors including the driver seat door cannot be opened to a predetermined opening degree enough to get in the vehicle.

First, at a state where the portable terminal 3 carried by the user U is arranged in the range of the communicable area A formed around the vehicle V by the wireless communication unit 11 of the in-vehicle device 2, a predetermined operation for remotely controlling the vehicle V is performed on the touch panel 52 of the portable terminal 3 and instruction information corresponding to the operation is transmitted from the portable terminal 3 to the in-vehicle device 2 of the vehicle V The in-vehicle control unit 14 of the in-vehicle device 2 controls the driving system of the vehicle V and the door opening and closing unit 12, based on the received instruction information.

The driving system (driving engine) of the vehicle V is enabled to start by control of the driving system of the vehicle V made by the in-vehicle control unit 14, so that the vehicle V is straightly moved forwards. After the vehicle V is advanced to a position at which the driver seat door of the vehicle V can be opened to the opening degree enough to get in the vehicle, the vehicle V is stopped. Also, as required, the driver seat door is automatically opened to the predetermined opening degree enough to get in the vehicle by control of the door opening and closing unit 12 made by the in-vehicle control unit 14.

In the meantime, as the case of automatically opening the driver seat door, a case where the user U is at the driver seat-side of the vehicle V and can immediately get in the vehicle V after the vehicle V is stopped can be exemplified, as shown in FIGS. 2 and 3.

FIG. 4 depicts processing to be executed by the in-vehicle control unit 14 of the in-vehicle device 2.

First, the in-vehicle control unit 14 authenticates the portable terminal 3 (step S1). Specifically, the in-vehicle control unit 14 intermittently transmits a request signal of the terminal identification information. The portable terminal 3 is arranged in the communicable area A, so that the portable terminal 3 receives the request signal of the terminal identification information, and the terminal identification information is transmitted from the portable terminal 3 having received the request signal to the in-vehicle device 2. The in-vehicle control unit 14 compares the received terminal identification information with authentication information stored in the in-vehicle control unit 14, and authenticates the portable terminal 3 when the terminal identification information and the authentication information coincide with each other. An authentication result is transmitted to the portable terminal 3.

The in-vehicle control unit 14 having successfully authenticated the portable terminal 3 (step S2—Yes) stands by until the instruction information, which is transmitted from the portable terminal 3, is received, and when a start instruction of the driving system of the vehicle V is received as the instruction information (step S3—Yes), the in-vehicle control unit starts the driving system of the vehicle V by using the driving system electronic control unit 10 of the vehicle V (step S4).

Continuously, when any one of the advance instruction, the advance and door opening instruction, the retreat instruction and the retreat and door opening instruction of the vehicle V is received as the instruction information (step S5), the in-vehicle control unit 14 advances or retreats the vehicle V by using the function of the driving system electronic control unit 10 of the vehicle V, and as required, controls the door opening and closing unit 12 to open the driver seat door to the predetermined opening degree, in correspondence to the received instruction.

When the advance instruction is received (step S5-1), the in-vehicle control unit 14 advances the vehicle V to a position at which the driver seat door can be opened (step S6a). Also, when the advance and door opening instruction is received (step S5-2), the in-vehicle control unit 14 advances the vehicle V to the position at which the driver seat door can be opened (step S7a) and additionally opens the driver seat door to the predetermined opening degree after the advance (step S8a).

On the other hand, when the retreat instruction is retreated (step S5-3), the in-vehicle control unit 14 retreats the vehicle V to the position at which the driver seat door can be opened (step S9a). Also, when the retreat and door opening instruction is received (step S5-4), the in-vehicle control unit 14 retreats the vehicle V to the position at which the driver seat door can be opened (step S10a) and additionally opens the driver seat door to a predetermined opening degree after the retreat (step S11a).

In the meantime, when advancing and retreating the vehicle V, the in-vehicle control unit 14 determines whether the steering angle of the vehicle V is within a prescribed direct advance allowable range. When the steering angle is beyond the direct advance allowable range, the steering angle is corrected into the direct advance allowable range by the in-vehicle control unit 14. Here, the direct advance allowable range means a range of the steering angle within which the vehicle V can be regarded to directly advance.

Also, the openable position of the driver seat door is set by a movement amount of the vehicle V, for example, and the movement amount is registered in advance in the in-vehicle control unit 14 or the terminal control unit 42. The movement amount is not particularly limited but is an entire length of the vehicle V, for example. Also, in the case of the advance, the movement amount may be set as a distance from a front end of the vehicle V to a rear end of the driver seat door, and in the case of the retreat, the movement amount may be set as a distance from a rear end of the vehicle V to a front end of the driver seat door, so that the movement amounts may be differently set for the advance and the retreat.

Also, the openable position of the driver seat door may be adaptively set on the basis of a position of the user carrying the portable terminal 3, and is a position at which the driver seat door aligns with the user in a width direction of the vehicle, for example. A positional relation between the driver seat door and the user can be detected by using a characteristic (distance attenuation) that a radio wave intensity of a signal attenuates in reverse proportion to a distance, on the basis of a radio wave intensity of a signal transmitted from the portable terminal 3 and received in the in-vehicle device 2 and a positional relation between the antenna 30 of the in-vehicle device 2 having received the signal and the driver seat door, for example.

Furthermore, in the example, the passenger's seating on the driver seat is detected by the seating detection unit 13, and when the seating detection signal output from the seating detection unit 13 is received (step S12—Yes), the in-vehicle control unit 14 controls the door opening and closing unit 12 to close the driver seat door (step S13).

FIGS. 5A to 5E depict operation screens to be displayed on the touch panel 52 of the portable terminal 3. In the meantime, it is assumed that the portable terminal 3 has been authenticated by the in-vehicle device 2.

First, as shown in FIG. 5A, the touch panel 52 is displayed thereon with a lock screen by display control of the terminal control unit 42. In this example, a pattern lock is used for screen lock of the touch panel 52. The pattern lock is a lock method in which a display area of the touch panel is divided into a plurality of sections as shown with a dashed-two dotted line in FIG. 5A and a swipe operation of connecting the plurality of sections is used for authentication. A pattern of the swipe operation for releasing the screen lock is registered in advance in the terminal control unit 42 by the user, and when the swipe operation (screen lock releasing operation) on the touch panel 52 coincides with the pattern registered in advance in the terminal control unit 42, the terminal control unit 42 releases the screen lock of the touch panel 52.

After the screen lock is released, a start icon I1 is displayed on the touch panel 52 by the display control of the terminal control unit 42, as shown in FIG. 5B. When a touch operation on the start icon I1 is received, the terminal control unit 42 transmits a start instruction of the driving system of the vehicle V to the in-vehicle device 2. In the in-vehicle device 2, the driving system of the vehicle V is enabled to start by the in-vehicle control unit 14 having received the start instruction (refer to step S4 of FIG. 4).

After the touch operation on the start icon I1 is received by the terminal control unit 42, an advance hierarchy icon I2 and a retreat hierarchy icon I3 are displayed on the touch panel 52 by the display control of the terminal control unit 42, as shown in FIG. 5C.

Then, when a touch operation on the advance hierarchy icon I2 is received by the terminal control unit 42, an advance icon I4 and an advance and door opening icon I5 are displayed on the touch panel 52 by the display control of the terminal control unit 42, as shown in FIG. 5D. When a touch operation on the advance icon I4 is received, the terminal control unit 42 transmits an advance instruction of the vehicle V to the in-vehicle device 2, and when a touch operation on the advance and door opening icon I5 is received, the terminal control unit 42 transmits an advance and door opening instruction of the vehicle V to the in-vehicle device 2. In the in-vehicle device 2, the vehicle V is advanced by the in-vehicle control unit 14 having received the advance instruction (refer to step S6a of FIG. 4), and the vehicle V is advanced by the in-vehicle control unit 14 having received the advance and door opening instruction and further the driver seat door is opened after the advance (refer to step S7a and step S8a of FIG. 4).

Also, when a touch operation on the retreat hierarchy icon I3 is received by the terminal control unit 42, a retreat icon I6 and a retreat and door opening icon I7 are displayed on the touch panel 52 by the display control of the terminal control unit 42, as shown in FIG. 5E. Then, when a touch operation on the retreat icon I6 is received, the terminal control unit 42 transmits a retreat instruction of the vehicle V to the in-vehicle device 2, and when a touch operation on the retreat and door opening icon I7 is received, the terminal control unit 42 transmits a retreat and door opening instruction of the vehicle V to the in-vehicle device 2. In the in-vehicle device 2, the vehicle V is retreated by the in-vehicle control unit 14 having received the retreat instruction (refer to step S9a of FIG. 4), and the vehicle V is retreated by the in-vehicle control unit 14 having received the retreat and door opening instruction and further the driver seat door is opened after the retreat (refer to step S10a and step S11a of FIG. 4).

The above operations of the portable terminal 3 are implemented as the terminal control unit 42 operates in accordance with a predetermined application program, and the portable terminal 3 is configured by installing a predetermined application program in a well-known smart phone or tablet terminal having a wireless communication unit and a touch panel, for example. The application program can be provided with being recorded in a non-transitory recording medium with which a computer can read the program, and the "computer-readable recording medium" includes an optical medium such as a CD-ROM (Compact Disc-ROM), a magnetic recording medium such as a memory card, and the like. Also, the application program can be downloaded through a network.

In the meantime, the above operations of the portable terminal 3 are exemplary and can be appropriately changed. For example, the display of the start icon I1 and the transmission of the start instruction based on the touch operation on the start icon I1 may be omitted, and the start instruction may be transmitted on the basis of the touch operation on the advance icon I4, the advance and door opening icon I5, the retreat icon I6 or the retreat and door opening icon I7. Also, only the advance and door opening icon I5 and the retreat and door opening icon I7 may be provided, and after the screen lock of the touch panel 52 is released, the advance and door opening icon I5 and the retreat and door opening icon I7 may be immediately displayed on the touch panel 52. Also, a stop icon for instructing stop of the vehicle V may be displayed on the touch panel 52.

According to the vehicle entry system 1, for example, it is possible to move the vehicle V, which is parked in a narrow space such as the vehicle door collides with the other adjacent vehicle if the vehicle door is opened to an opening degree enough to get in the vehicle to the position at which the driver seat door can be opened by the remote control through the portable terminal 3 and to automatically open the driver seat door after the movement, as required. Therefore, it is possible to improve the user's convenience when getting in the vehicle.

Also, in the above example, the user's seating on the driver seat is detected by the seating detection unit 13, so that it is possible to automatically close the driver seat door after the user sits on the driver seat. Therefore, it is possible to further improve the user's convenience when getting in the vehicle.

In the meantime, the door to be opened and closed by the door opening and closing unit 12 may include a front passenger seat door, in addition to the driver seat door. When the front passenger seat door is included, both the driver seat door and the front passenger seat door may be opened on the basis of the touch operation on the advance and door opening icon I5 or the retreat and door opening icon I7, and an icon for selecting a door to be additionally opened may be displayed after the touch operation on the advance and door opening icon I5 or the retreat and door opening icon I7 and a door to be opened may be selected on the basis of a touch operation on the corresponding icon, for example.

FIGS. 6 and 7 depict a modified embodiment of the portable terminal 3.

The portable terminal 3 may be configured by installing a predetermined application program in a well-known smart phone or tablet terminal having a wireless communication unit and a touch panel but may also be configured as a dedicated terminal. When the portable terminal is configured as a dedicated terminal, the vehicle may include specific elements. In the example of FIGS. 6 and 7, the portable terminal 3 further includes an operation key 43 and a key holding unit 44, and the operation unit 41 is provided with a locking button 53 and an unlocking button 54.

The operation key 43 is configured to manually operate the key cylinder provided in the vehicle door and to switch the locking and unlocking mechanism, which is included in the lock device 20 (refer to FIG. 1) of the door opening and closing unit 12, between the lock state and the unlock state by a manual operation. The key holding unit 44 is configured to separably hold the operation key 43. The key holding unit 44 is configured by an electric lock such as a solenoid lock.

The holding and holding release of the operation key 43 by the key holding unit 44 are controlled by the terminal control unit 42. At a state where the lock screen shown in FIG. 5A is displayed on the touch panel 52, when the swipe operation (screen lock releasing operation) on the touch panel 52 coincides with the pattern registered in advance in the terminal control unit 42, the terminal control unit 42 releases the screen lock of the touch panel 52 and also releases the holding of the operation key 43 made by the key holding unit 44.

The locking button 53 and the unlocking button 54 are operation buttons provided on an outer side of the touch panel 52 and are configured by push-type switches or the like. The operations on the locking button 53 and the unlocking button 54 are received by the terminal control unit 42 at a state where the screen lock of the touch panel 52 is released. When the operation on the locking button 53 is received, the terminal control unit 42 transmits a lock instruction of the vehicle door to the in-vehicle device 2, and when the operation on the unlocking button 54 is received, the terminal control unit 42 transmits a lock releasing instruction of the vehicle door to the in-vehicle device 2.

In the in-vehicle device 2, the motor 32 (refer to FIG. 1) of the locking and unlocking mechanism is driven by the in-vehicle control unit 14 having received the lock instruction or the lock releasing instruction. Thereby, in response to the lock instruction, the locking and unlocking mechanism becomes in the lock state and the vehicle door is thus locked, and in response to the lock releasing instruction, the locking and unlocking mechanism becomes in the unlock state and the lock of the vehicle door is thus released.

In the meantime, when the vehicle door is opened on the basis of the touch operation on the advance and door opening icon I5 or the retreat and door opening icon I7, even though the locking and unlocking mechanism of the door opening and closing unit 12 is in the lock state, the ratchet is moved from the engaging position to the disengaging position by the motor 33 (refer to FIG. 1) of the disengaging mechanism. However, preferably, based on the touch operation on the advance and door opening icon I5 or the retreat and door opening icon I7, the lock releasing instruction is transmitted to the in-vehicle device 2, irrespective of the operation on the unlocking button 54, so that the locking and unlocking mechanism is switched to the unlock state.

FIG. 8 depicts another example of the vehicle entry system, which illustrates an illustrative embodiment of the present invention. In the meantime, the elements in common with the vehicle entry system 1 as stated above are denoted with the common reference numerals and the descriptions thereof are omitted.

An in-vehicle device 102 of a vehicle entry system 101 shown in FIG. 8 further includes an imaging unit 15 configured to capture a surrounding of the vehicle V. Meanwhile, hereinafter, it is described that the vehicle door to be locked and unlocked by the door opening and closing unit 12 is only the driver seat door.

The imaging unit 15 includes one or more cameras and is configured to capture a surrounding of the vehicle V including the front and rear of the vehicle V and a vehicle-side of the driver seat-side. Although the number and installation locations of the cameras are not particularly limited, the cameras are respectively provided at a front grill, a rear frame and a driver seat-side pillar of the vehicle V, for example.

The in-vehicle control unit 14 is configured to detect an obstacle existing in the surrounding of the vehicle V from a captured image captured by the imaging unit 15 and to control the door opening and closing unit 12 and the driving system of the vehicle V on the basis of an instruction received from the portable terminal 3 and a detection result of the obstacle.

FIGS. 9 to 12 depict processing to be executed by the in-vehicle control unit 14 of the in-vehicle device 102.

First, the in-vehicle control unit 14 authenticates the portable terminal 3 (step S1). When the in-vehicle control unit 14 having successfully authenticated the portable terminal 3 (step S2——Yes) receives the start instruction of the driving system of the vehicle V, as the instruction information (step S3—Yes), the in-vehicle control unit starts the driving system of the vehicle V by using the function of the driving system electronic control unit 10 of the vehicle V (step S4).

Continuously, when any one of the advance instruction, the advance and door opening instruction, the retreat instruction and the retreat and door opening instruction of the vehicle V is received as the instruction information (step S5), the in-vehicle control unit 14 advances or retreats the vehicle V by using the function of the driving system electronic control unit 10 of the vehicle V, in correspondence to the received instruction, and as required, controls the door opening and closing unit 12 to open the driver seat door.

When the advance instruction is received (step S5-1), the in-vehicle control unit 14 advances the vehicle V to a position at which the driver seat door can be opened (step S6b). At this time, the in-vehicle control unit 14 detects an obstacle in front of the vehicle V from the captured image captured by the imaging unit 15. When there is no obstacle (step S20—Yes), the in-vehicle control unit advances the vehicle (step S21). On the other hand, when there is an obstacle (step S20—No), the in-vehicle control unit stops the vehicle (step S22) and ends the processing.

Also, when the advance and door opening instruction is received (step S5-2), the in-vehicle control unit 14 first advances the vehicle V to the position at which the driver seat door can be opened (step S7b). At this time, the in-vehicle control unit 14 detects an obstacle in front of the vehicle V from the captured image captured by the imaging unit 15. When there is no obstacle (step S20—Yes), the in-vehicle control unit advances the vehicle (step S21). On the other hand, when there is an obstacle (step S20—No), the in-vehicle control unit stops the vehicle (step S22) and ends the processing.

Then, the in-vehicle control unit opens the driver seat door after the vehicle V is advanced to the position at which the driver seat door can be opened (step S8b). At this time, the in-vehicle control unit 14 detects an obstacle at a vehicle-side of the driver seat-side of the vehicle V from the captured image captured by the imaging unit 15 (step S23). When there is no obstacle (step S23—Yes), the in-vehicle control unit opens the driver seat door (step S24). On the other hand, when there is an obstacle (step S23—No), the in-vehicle control unit stops the driver seat door (step S25) and ends the processing.

When the retreat instruction is retreated (step S5-3), the in-vehicle control unit 14 retreats the vehicle V to the position at which the driver seat door can be opened (step S9b). At this time, the in-vehicle control unit 14 detects an obstacle at the rear of the vehicle V from the captured image captured by the imaging unit 15. When there is no obstacle (step S26—Yes), the in-vehicle control unit retreats the vehicle (step S27). On the other hand, when there is an obstacle (step S26—No), the in-vehicle control unit stops the vehicle (step S28) and ends the processing.

Also, when the retreat and door opening instruction is received (step S5-4), the in-vehicle control unit 14 first retreats the vehicle V to the position at which the driver seat door can be opened (step S10b). At this time, the in-vehicle control unit 14 detects an obstacle at the rear of the vehicle V from the captured image captured by the imaging unit 15. When there is no obstacle (step S26—Yes), the in-vehicle control unit retreats the vehicle (step S27). On the other hand, when there is an obstacle (step S26—No), the in-vehicle control unit stops the vehicle (step S28) and ends the processing.

Then, the in-vehicle control unit opens the driver seat door after the vehicle V is retreated to the position at which the driver seat door can be opened (step S11b). At this time, the in-vehicle control unit 14 detects an obstacle at a vehicle-side of the driver seat-side of the vehicle V from the captured image captured by the imaging unit 15 (step S22). When there is no obstacle (step S23—Yes), the in-vehicle control unit opens the driver seat door (step S24). On the other hand, when there is an obstacle (step S23—No), the in-vehicle control unit stops the driver seat door (step S25) and ends the processing.

In the meantime, when there is an obstacle at a vehicle-side of the driver seat-side, the driver seat door may be reversely closed in step S25.

According to the vehicle entry system 101, like the vehicle entry system 1, it is possible to improve the user's convenience when getting in the vehicle, to automatically stop the vehicle V when there is an obstacle in the moving direction of the vehicle V and to stop or reversely close the driver seat door when there is an obstacle on an opening trajectory of the driver seat door. Therefore, it is possible to avoid contact between the vehicle V and the obstacle and to thus prevent the vehicle V from being damaged due to the contact with the obstacle.

REFERENCE SIGNS LIST

1: Vehicle entry system
2: In-vehicle device
3: Portable terminal
10: Driving system electronic control unit
11: Wireless communication unit
12: Door opening and closing unit
13: Seating detection unit
14: In-vehicle control unit
15: Imaging unit
20: Lock device
21: Opening and closing device
30: Antenna
31: Signal processing circuit
32: Motor
33: Motor
34: Motor
35: Communication bus
40: Wireless communication unit
41: Operation unit
42: Terminal control unit
43: Operation key
44: Key holding unit
50: Antenna
51: Signal processing circuit
52: Touch panel
53: Locking button
54: Unlocking button
101: Vehicle entry system
102: In-vehicle device
A: Communicable area
I1: Start icon
I2: Advance hierarchy icon
I3: Retreat hierarchy icon
I4: Advance icon
I5: Advance and door opening icon
I6: Retreat icon
I7: Retreat and door opening icon
U: User
V: Vehicle

The invention claimed is:

1. A vehicle entry system comprising:
a portable terminal; and
an in-vehicle device configured to perform wireless communication with the portable terminal,
wherein the in-vehicle device comprises:
a door opening and closing device configured to lock a door of a vehicle at a closed state and to open the door to a predetermined opening degree; and
an in-vehicle controller configured to authenticate the portable terminal and to control a driving system of the vehicle and the door opening and closing device on the basis of an instruction to be transmitted from the authenticated portable terminal,
wherein the portable terminal comprises:
an interface comprising a touch panel; and
a terminal controller configured to output an instruction to the in-vehicle controller on the basis of an operation on the interface,
wherein the touch panel is configured to display a plurality of icons comprising:
a start icon for instructing start of the driving system of the vehicle;
an advance icon for instructing advance to an openable position of the door;
an advance and door opening icon for instructing the vehicle to advance to the openable position of the door and to open the door by the door opening and closing device after the advance, wherein the in-vehicle controller is configured to advance the vehicle to the openable position of the door and to additionally open the door to the predetermined opening degree after the advance, when an instruction from the advance and door opening icon is received;
a retreat icon for instructing retreat to the openable position of the door;
a retreat and door opening icon for instructing the vehicle to retreat to the openable position of the door and to open the door by the door opening and closing device after the retreat, wherein the in-vehicle controller is configured to retreat the vehicle to the openable position of the door and to additionally open the door to the predetermined opening degree after the retreat, when an instruction from the retreat and door opening icon is received; and wherein the openable position of the door is adaptably set on the basis of a positional relation between the door and a user carrying the portable terminal, wherein the positional relation is detected on the basis of a radio wave intensity of a signal transmitted from the portable terminal and received in the in-vehicle device and a positional relation between an antenna of the in-vehicle device having received the signal and the door.

2. The vehicle entry system according to claim 1, wherein the terminal controller is configured to display the icons on the touch panel and to receive an operation on the icons when a screen lock releasing operation on the touch panel coincides with a pattern registered in advance in the terminal controller.

3. The vehicle entry system according to claim 1, wherein the interface further comprises:
- a locking button configured to instruct lock of the door by the door opening and closing device; and
- an unlocking button configured to instruct lock release of the door by the door opening and closing device, the buttons being operation buttons provided on an outer side of the touch panel.

4. The vehicle entry system according to claim 3, wherein the terminal controller outputs an instruction to release the lock of the door by the door opening and closing device when an operation on the advance and door opening icon or the retreat and door opening icon is performed in spite of an operation on the unlocking button.

5. A vehicle entry system comprising:
- a portable terminal; and
- an in-vehicle device configured to perform wireless communication with the portable terminal,
- wherein the in-vehicle device comprises:
  - a door opening and closing device configured to lock a door of a vehicle at a closed state and to open the door to a predetermined opening degree; and
  - an in-vehicle controller configured to authenticate the portable terminal and to control a driving system of the vehicle and the door opening and closing device on the basis of an instruction to be transmitted from the authenticated portable terminal,
- wherein the portable terminal comprises:
  - an interface comprising a touch panel; and
  - a terminal controller configured to output an instruction to the in-vehicle controller on the basis of an operation on the interface, and
- wherein the touch panel is configured to display a plurality of icons comprising:
  - a start icon for instructing start of the driving system of the vehicle;
  - an advance icon for instructing advance to an openable position of the door;
  - an advance and door opening icon for instructing the vehicle to advance to the openable position of the door and to open the door by the door opening and closing device after the advance;
  - a retreat icon for instructing retreat to the openable position of the door; and
  - a retreat and door opening icon for instructing the vehicle to retreat to the openable position of the door and to open the door by the door opening and closing device after the retreat,
- wherein the portable terminal further comprises:
  - an operation key for manually operating lock and lock release of the door by the door opening and closing device; and
  - a key holder configured to separably hold the operation key, and
- wherein the terminal controller releases a holding state of the operation key made by the key holder when a screen lock releasing operation on the touch panel coincides with a pattern registered in advance in the terminal controller.

6. The vehicle entry system according to claim 1, wherein the in-vehicle device further comprises a seating detector configured to detect passenger's seating on a seat provided in the vicinity of the door, and wherein the in-vehicle controller closes the door when the passenger's seating is detected by the seating detector.

7. The vehicle entry system according to claim 1, wherein the door comprises a driver seat door and a front passenger seat door of the vehicle.

8. The vehicle entry system according to claim 1, wherein the door is a driver seat door of the vehicle.

9. A vehicle entry system comprising:
- a portable terminal; and
- an in-vehicle device configured to perform wireless communication with the portable terminal,
- wherein the in-vehicle device comprises:
- a door opening and closing device configured to lock a driver seat door of a vehicle at a closed state and to open the driver seat door to a predetermined opening degree;
- and an in-vehicle controller configured to authenticate the portable terminal and to control a driving system of the vehicle and the door opening and closing device on the basis of an instruction to be transmitted from the authenticated portable terminal,
- wherein the portable terminal comprises:
- an interface including a touch panel; and
- a terminal controller configured to output an instruction to the in-vehicle controller on the basis of an operation on the interface,
- wherein the touch panel is configured to display:
- an advance and door opening icon for instructing the vehicle to advance to an openable position of the driver seat door and to open the driver seat door by the door opening and closing device after the advance, wherein the in-vehicle controller is configured to advance the vehicle to the openable position of the driver seat door and to additionally open the driver seat door to the predetermined opening degree after the advance, when an instruction from the advance and door opening icon is received;
- a retreat and door opening icon for instructing the vehicle to retreat to the openable position of the driver seat door and to open the driver seat door by the door opening and closing device after the retreat, wherein the in-vehicle controller is configured to retreat the vehicle to the openable position of the door and to additionally open the door to the predetermined opening degree after the retreat, when an instruction from the retreat and door opening icon is received; and
- wherein the openable position of the door is adaptably set on the basis of a positional relation between the door and a user carrying the portable terminal,
- wherein the positional relation is detected on the basis of a radio wave intensity of a signal transmitted from the portable terminal and received in the in-vehicle device and a positional relation between an antenna of the in-vehicle device having received the signal and the door.

10. The vehicle entry system according to claim 9, wherein the in-vehicle device further comprises an imaging device configured to capture a surrounding of the vehicle comprising a front and a rear of the vehicle V and a vehicle-side of a driver seat-side, wherein while the vehicle advances on the basis of an instruction transmitted from the portable terminal, the in-vehicle controller detects an obstacle in front of the vehicle on the basis of a captured image to be captured by the imaging device and stops the vehicle when the obstacle is detected, wherein while the vehicle retreats on the basis of an instruction transmitted from the portable terminal, the in-vehicle controller detects an obstacle at the rear of the vehicle on the basis of a captured image to be captured by the imaging device and stops the vehicle when the obstacle is detected, and wherein while the driver seat door is opened to a predetermined opening degree by the door opening and closing device on the basis of an instruction transmitted from the portable terminal, the in-vehicle controller detects an obstacle at the vehicle-side of the driver seat-side of the vehicle on the basis of a captured image to be captured by the imaging device and stops or reversely closes the driver seat door when the obstacle is detected.

11. The vehicle entry system according to claim 9, wherein the in-vehicle device further comprises a seating detector configured to detect passenger's seating on a driver seat of the vehicle, and wherein the in-vehicle controller closes a driver seat door when the passenger's seating is detected by the seating detector.

12. An in-vehicle device configured to perform wireless communication with a portable terminal, the in-vehicle device comprising:

a door opening and closing device configured to lock a door of a vehicle, which has the in-vehicle device mounted therein, at a closed state and to open the door to a predetermined opening degree; and an in-vehicle controller configured to authenticate the portable terminal and to control a driving system of the vehicle and the door opening and closing device on the basis of an instruction to be transmitted from the authenticated portable terminal, wherein in response to an instruction to be transmitted from the portable terminal, the in-vehicle controller is configured to start a driving system of the vehicle and control the vehicle to:

advance the vehicle to an openable position of the door and additionally open the door by the door opening and closing device after advancing the vehicle to the openable position of the door;

or retreat the vehicle to the openable position of the door and additionally open the door by the door opening and closing device after retreating the vehicle to the openable position of the door, and wherein the openable position of the door is adaptably set on the basis of a positional relation between the door and a user carrying the portable terminal, wherein the positional relation is detected on the basis of a radio wave intensity of a signal transmitted from the portable terminal and received in the in-vehicle device and a positional relation between an antenna of the in-vehicle device having received the signal and the door.

13. The vehicle entry system according to claim 1, wherein a movement is registered in advance in the in-vehicle controller or the terminal controller.

* * * * *